(12) United States Patent
Shin et al.

(10) Patent No.: US 12,321,558 B2
(45) Date of Patent: Jun. 3, 2025

(54) DISPLAY DEVICE

(71) Applicant: Samsung Display Co., Ltd., Yongin-Si (KR)

(72) Inventors: Hyuneok Shin, Yongin-si (KR); Joon Woo Bae, Yongin-si (KR); Juhyun Lee, Yongin-si (KR); Samtae Jeong, Yongin-si (KR); Yung Bin Chung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/418,370

(22) Filed: Jan. 22, 2024

(65) Prior Publication Data

US 2024/0338100 A1    Oct. 10, 2024

(30) Foreign Application Priority Data

Apr. 10, 2023 (KR) ........................ 10-2023-0047041

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/0446* (2019.05); *G06F 2203/04112* (2013.01)

(58) Field of Classification Search
None
See application file for complete search history.

(56) References Cited

U.S. PATENT DOCUMENTS

| 8,339,031 | B2 | 12/2012 | Tchakarov et al. | |
|---|---|---|---|---|
| 11,626,469 | B2 | 4/2023 | Baek et al. | |
| 2012/0292170 | A1* | 11/2012 | Yin | G06F 3/0446 |
| | | | | 200/512 |
| 2015/0253899 | A1* | 9/2015 | Yang | C23C 14/0641 |
| | | | | 204/192.15 |
| 2017/0115770 | A1* | 4/2017 | Han | G06F 3/0446 |
| 2017/0353181 | A1* | 12/2017 | Kim | G06F 3/0416 |
| 2018/0308903 | A1* | 10/2018 | Jeong | G06F 3/04164 |
| 2020/0033976 | A1* | 1/2020 | Yin | G06F 3/0412 |

(Continued)

FOREIGN PATENT DOCUMENTS

| JP | 2012-189726 A | 10/2012 |
|---|---|---|
| JP | 2014-142430 A | 8/2014 |
| KR | 10-2022-0006679 A | 1/2022 |

*Primary Examiner* — Benjamin X Casarez
(74) *Attorney, Agent, or Firm* — Innovation Counsel LLP

(57) ABSTRACT

A display device includes a display panel including a light emitting area and a non-light-emitting area adjacent to the light emitting area and an input sensor disposed on the display panel. The input sensor includes a first sensor conductive layer disposed on the display panel, a first sensor insulating layer disposed on the first sensor conductive layer, and a second sensor conductive layer disposed on the first sensor insulating layer. At least one of the first sensor conductive layer and the second sensor conductive layer is provided with a mesh opening defined therethrough, at least one of a side surface of the first sensor conductive layer and a side surface of the second sensor conductive layer is provided with a recessed portion defined therein, and the input sensor further includes a light absorption layer disposed in the recessed portion.

16 Claims, 19 Drawing Sheets

(56) References Cited

U.S. PATENT DOCUMENTS

2021/0055830 A1\* 2/2021 Xu .................... G06F 3/0443
2022/0050542 A1\* 2/2022 Choi .................. H10K 50/844
2022/0317491 A1 10/2022 Yu \* cited by examiner

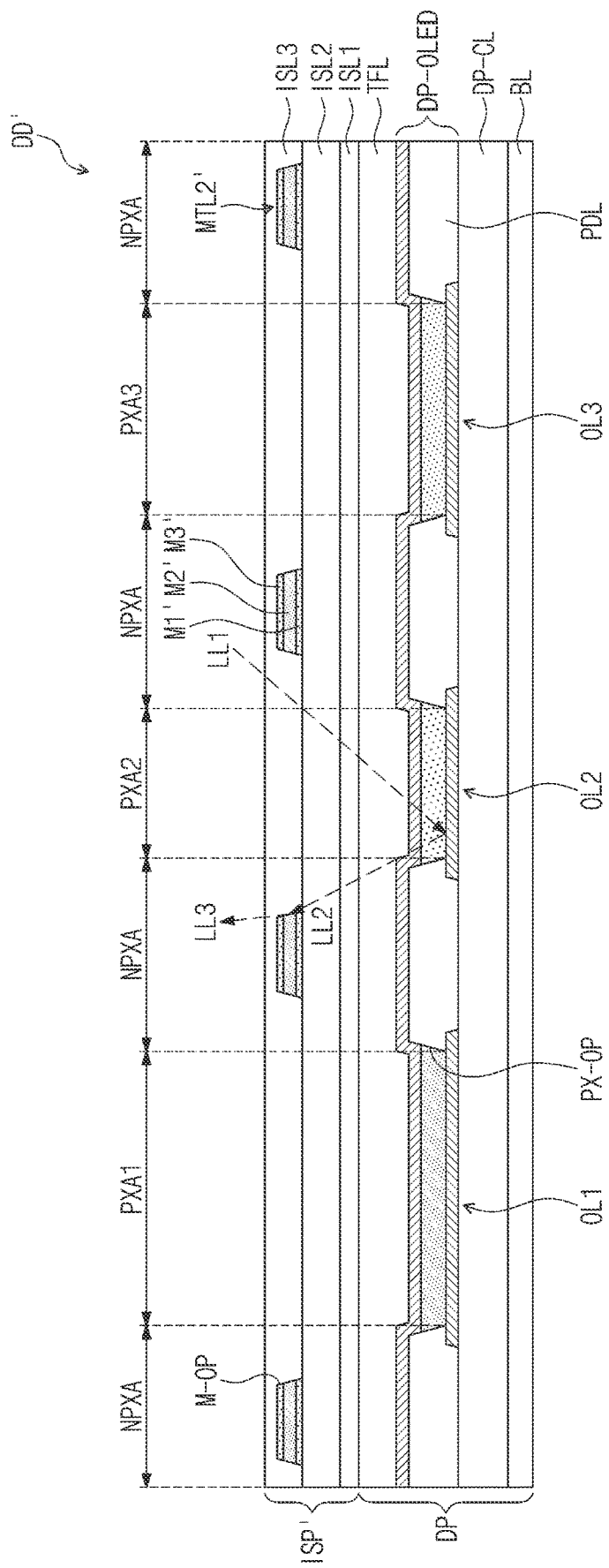

DISPLAY DEVICE

This U.S. non-provisional patent application claims priority under 35 U.S.C. § 119 of Korean Patent Application No. 10-2023-0047041, filed on Apr. 10, 2023, the contents of which are hereby incorporated by reference in its entirety.

BACKGROUND

1. Field of Disclosure

The present disclosure relates to a display device including a display panel and an input sensor.

2. Description of the Related Art

Multimedia devices, such as televisions, mobile phones, tablet computers, navigation units, and game units, include a display device to provide users with images through a display screen. The display device includes an input sensor that provides a touch-based input method allowing users to easily and intuitively input information or commands.

The display device includes a display panel generating the images and the input sensor sensing a user's touch. The input sensor includes a conductor sensing an external input, and the conductor of the input sensor affects a light emission efficiency of the display device or a reflectance of the display device with respect to an external light.

SUMMARY

The present disclosure may provide a display device including an input senor and having a reduced reflectance with respect to an external light.

An embodiment of a display device includes a display panel including a light emitting area and a non-light-emitting area adjacent to the light emitting area and an input sensor disposed on the display panel. The input sensor includes a first sensor conductive layer disposed on the display panel, a first sensor insulating layer disposed on the first sensor conductive layer, and a second sensor conductive layer disposed on the first sensor insulating layer. At least one of the first sensor conductive layer and the second sensor conductive layer is provided with a mesh opening defined therethrough, at least one of a side surface of the first sensor conductive layer and a side surface of the second sensor conductive layer is provided with a recessed portion defined therein, and the input sensor further includes a light absorption layer disposed in the recessed portion.

The second sensor conductive layer may include a first conductive layer disposed on the first sensor insulating layer, a second conductive layer disposed on the first conductive layer, and a third conductive layer disposed on the second conductive layer, a side surface of the first conductive layer and a side surface of the third conductive layer protrude outward more than a side surface of the second conductive layer to define the recessed portion, and the side surface of the second conductive layer is covered by the light absorption layer.

The input sensor may further include a second sensor insulating layer disposed on the second sensor conductive layer, and the second sensor insulating layer is in contact with the side surface of the first conductive layer, the side surface of the third conductive layer, and an upper surface of the third conductive layer and is not in contact with the side surface of the second conductive layer.

The first conductive layer and the third conductive layer may include the same material as each other, and the second conductive layer includes a different material from the first conductive layer and the third conductive layer.

The first conductive layer and the third conductive layer may include titanium (Ti), and the second conductive layer includes aluminum (Al) or copper (Cu).

The first sensor conductive layer includes a first conductive layer disposed on the display panel, a second conductive layer disposed on the first conductive layer, and a third conductive layer disposed on the second conductive layer, a side surface of the first conductive layer and a side surface of the third conductive layer protrude outward more than a side surface of the second conductive layer to form the recessed portion, and the side surface of the second conductive layer is covered by the light absorption layer.

In an embodiment, the first sensor insulating layer is in contact with the side surface of the first conductive layer, the side surface of the third conductive layer, and an upper surface of the third conductive layer and is not in contact with the side surface of the second conductive layer.

The first conductive layer and the third conductive layer may include the same material as each other, and the second conductive layer includes a different material from the first conductive layer and the third conductive layer.

The first conductive layer and the third conductive layer may include titanium (Ti), and the second conductive layer includes aluminum (Al) or copper (Cu).

The light absorption layer may include molybdenum-niobium oxide ($MoNbO_x$).

In an embodiment, the light absorption layer has a thickness of about 400 angstroms to about 1000 angstroms.

The light absorption layer may include amorphous silicon (a-Si) or silicon carbide (SiC).

In an embodiment, the light absorption layer has a thickness of about 40 angstroms to about 1000 angstroms.

An embodiment of a display device includes a display panel including a display area and an input sensor including a sensing area overlapping the display area and disposed on the display panel. The input sensor includes first sensing electrodes disposed in the sensing area and each including first sensing patterns arranged in a first direction and second sensing electrodes disposed in the sensing area and each including second sensing patterns arranged in a second direction intersecting the first direction. Each of the first sensing patterns and the second sensing patterns include a side surface in which a recessed portion is defined, and the input sensor further includes a light absorption layer disposed in the recessed portion.

Each of the first sensing patterns and the second sensing patterns may include a first conductive layer, a second conductive layer disposed on the first conductive layer, and a third conductive layer disposed on the second conductive layer, a side surface of the first conductive layer and a side surface of the third conductive layer protrude outward more than a side surface of the second conductive layer to define the recessed portion, and the side surface of the second conductive layer is covered by the light absorption layer.

The first conductive layer and the third conductive layer may include the same material as each other, and the second conductive layer includes a different material from the first conductive layer and the third conductive layer.

The first conductive layer and the third conductive layer may include titanium (Ti), and the second conductive layer includes aluminum (Al) or copper (Cu).

The light absorption layer may include molybdenum-niobium oxide (MoNbO$_x$), and the light absorption layer has a thickness of about 400 angstroms to about 1000 angstroms.

In an embodiment, the light absorption layer includes amorphous silicon (a-Si) or silicon carbide (SiC), and the light absorption layer has a thickness of about 40 angstroms to about 1000 angstroms.

Each of the first sensing patterns and the second sensing patterns may include a mesh opening.

According to the above, the display device includes the input sensor, and the input sensor includes the sensing electrode that is provided with the recessed portion defined in the side surface thereof and the light absorption layer disposed in the recessed portion. Accordingly, the reflectance of the external light reflected at the side surface of the sensing electrode is reduced.

BRIEF DESCRIPTION OF THE DRAWINGS

The above and other advantages of the present disclosure will become readily apparent by reference to the following detailed description when considered in conjunction with the accompanying drawings wherein:

FIG. 8C is a cross-sectional view of a display device according to a comparative example;

DETAILED DESCRIPTION

Figure 1:
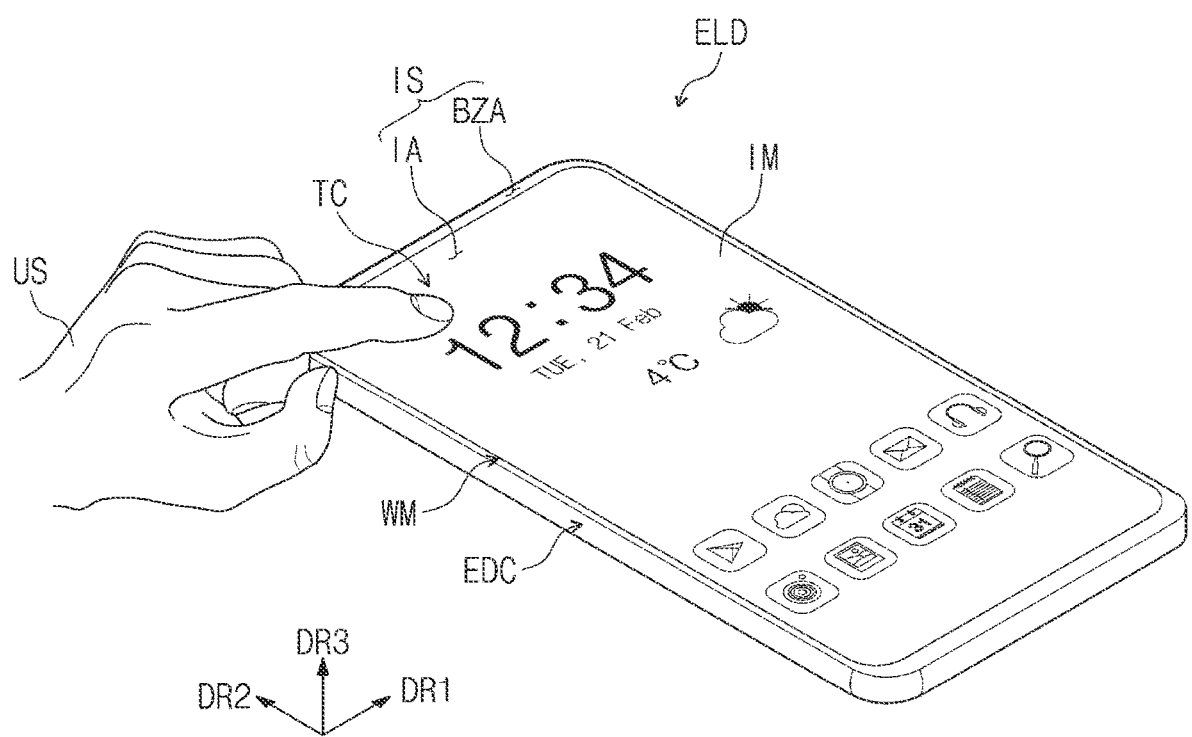
FIG. 1 is an assembled perspective view of an electronic device according to an embodiment of the present disclosure.

The present disclosure may be variously modified and realized in many different forms, and thus specific embodiments will be exemplified in the drawings and described in detail hereinbelow. However, the present disclosure should not be limited to the specific disclosed forms, and be construed to include all modifications, equivalents, or replacements included in the spirit and scope of the present disclosure.

As used herein, the singular forms, "a", "an" and "the" are intended to include the plural forms as well, unless the context clearly indicates otherwise.

It will be further understood that the terms "comprise", "comprising", "include", and "including", when used in this specification, specify the presence of stated features, integers, steps, operations, elements, or components, but do not preclude the presence or addition of one or more other features, integers, steps, operations, elements, components, or groups thereof.

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Spatially relative terms, such as "below", "lower", "above", "upper" and the like, may be used herein for ease of description to describe one element or feature's relationship to another elements or features as shown in the figures.

In the present disclosure, the term "on" may mean that a portion of an element is disposed at a lower portion as well as an upper portion of another element.

Meanwhile, in the present disclosure, when an element is referred to as being "directly connected" to another element, there are no intervening elements present between a layer, film region, or substrate and another layer, film, region, or substrate. For example, the term "directly connected" may mean that two layers or two members are disposed without employing additional adhesive therebetween.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

It will be understood that, although the terms first, second, etc. may be used herein to describe various elements, these elements should not be limited by these terms. These terms are only used to distinguish one element from another element. Thus, a first element discussed below could be termed a second element and vice versa without departing from the teachings of the present disclosure.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Like numerals refer to like elements throughout. In the drawings, the thickness, ratio, and dimension of components are exaggerated for effective description of the technical content.

Hereinafter, embodiments of the present disclosure will be described with reference to accompanying drawings.

Figure 2:
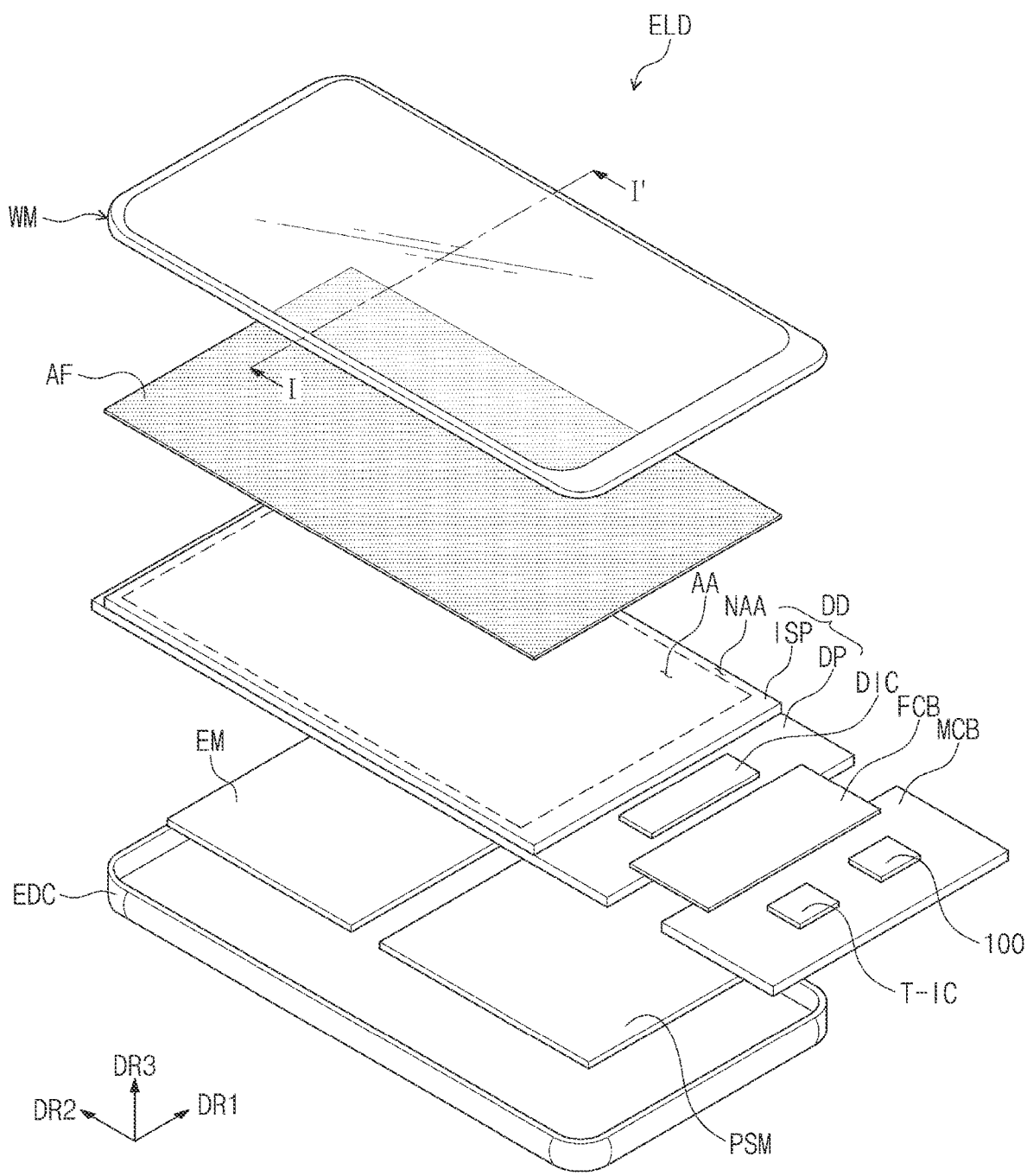
FIG. 2 is an exploded perspective view of an electronic device according to an embodiment of the present disclosure.

FIG. 1 is an assembled perspective view of an electronic device ELD according to an embodiment of the present disclosure, and FIG. 2 is an exploded perspective view of the electronic device ELD according to an embodiment of the present disclosure.

Referring to FIG. 1, the electronic device ELD may be activated in response to electrical signals and may display images. As an example, the electronic device ELD may be applied to a large-sized display device, such as a television set, an outdoor billboard, etc., and a small and medium-sized display device, such as a monitor, a mobile phone, a tablet computer, a navigation unit, a game unit, etc. However, these are merely examples, and the electronic device ELD may be applied to other display devices as long as they do not depart from the concept of the present disclosure.

The electronic device ELD may be rigid or flexible. The term "flexible" used herein refers to the property of being able to be bent. For example, the electronic device ELD that is flexible may be a curved device, a rollable device, or a foldable device.

In the present embodiment, a third direction DR3 may be substantially perpendicular to a plane defined by a first direction DR1 and a second direction DR2. Front (or upper) and rear (or lower) surfaces of each member of the electronic device ELD may be opposite to each other in the third direction DR3, and a normal line direction of each of the front and rear surfaces may be substantially parallel to the third direction DR3. A separation distance between the front surface and the rear surface in the third direction DR3 may correspond to a thickness in the third direction DR3 of each member.

In the present disclosure, the expression "when viewed in a plane" may mean a state of being viewed in the third direction DR3. In the present disclosure, the expression "When viewed in a cross-section" may mean a state of being viewed in the first direction DR1 or the second direction DR2. Meanwhile, directions indicated by the first, second, and third directions DR1, DR2, and DR3 are relative to each other, and thus, the directions indicated by the first, second, and third directions DR1, DR2, and DR3 may be changed to other directions.

The electronic device ELD may display an image IM to the third direction DR3 through a display surface IS substantially parallel to the plane defined by the first direction DR1 and the second direction DR2. However, the shape of the display surface IS should not be limited thereto or thereby, and the display surface IS may further include a curved surface bent from at least one side of the plane. The display surface IS through which the image IM is displayed may correspond to a front surface of the electronic device ELD. The image IM may include a video as well as a still image. FIG. 1 shows a clock widget and application icons as representative examples of the image IM.

The electronic device ELD may have a rectangular shape with short sides extending in the first direction DR1 and long sides extending in the second direction DR2 intersecting the first direction DR1. However, the shape of the electronic device ELD should not be limited to the rectangular shape, and the electronic device ELD may have a variety of shapes, such as a circular shape, a polygonal shape, etc.

The electronic device ELD may sense an external input TC applied thereto from the outside. The external input TC may include inputs of various forms, such as force, pressure, temperature, light, etc. In the present embodiment, a touch input generated by a hand of a user US and applied to the front surface of the electronic device ELD will be described as a representative example of the external input TC. However, this is merely example, and the external input TC may include all types of inputs that cause a variation in capacitance. The area of the electronic device ELD in which the external input TC is sensed should not be limited to the front surface of the electronic device ELD, and the electronic device ELD may sense the external input TC by the user US applied to a side or rear surface of the electronic device ELD depending on a structure of the electronic device ELD.

The display surface IS of the electronic device ELD may include an image area IA and a bezel area BZA. The image IM may be displayed through the image area IA. The user may view the image IM through the image area IA. In the present embodiment, the image area IA may have a quadrangular shape with rounded vertices. However, this is merely an example, and the image area IA may have a variety of shapes.

The bezel area BZA may have a predetermined color and may block the light. The bezel area BZA may be defined adjacent to the image area IA. As an example, the bezel area BZA may be disposed outside the image area IA and may surround the image area IA. Accordingly, the shape of the image area IA may be substantially defined by the bezel area BZA, however, this is merely an example. That is, the bezel area BZA may be disposed adjacent to only one side of the image area IA, may be disposed at a side surface of the electronic device ELD, or may be omitted.

Referring to FIGS. 1 and 2, the electronic device ELD may include a window WM, a display device DD, an optical member AF, an electronic module EM, a power module PSM, and a case EDC.

The window WM may be disposed on the display device DD and the optical member AF. The window WM may protect the display device DD from external impacts and scratches applied to the display device DD. A front surface of the window WM may correspond to the display surface IS of the electronic device ELD.

The optical member AF may be disposed on the display device DD. The optical member AF may decrease a reflectance of the display device DD with respect to an external light. As an example, the optical member AF may include a polarizing film including a retarder or a polarizer, a plurality of reflective layers destructively interfering with reflected lights, or a plurality of color filters disposed to correspond to an arrangement and a light emission color of the pixels.

The display device DD may generate the image IM that travels to the outside of the electronic device ELD and may sense the external input TC. The display device DD may include a display panel DP and an input sensor ISP.

The display panel DP may display the image IM in response to electrical signals. The display panel DP according to an embodiment may be a light emitting type display panel, however, it should not be particularly limited. For instance, the display panel DP may be an organic light emitting display panel, an inorganic light emitting display panel, or a quantum dot light emitting display panel. Hereinafter, the organic light emitting display panel will be described as a representative example of the display panel DP.

The input sensor ISP may be disposed on the display panel DP. The input sensor ISP may sense the external input TC and may provide an input signal including information about the external input TC to allow the display panel DP to display the image IM correspond to the external input TC. The input sensor ISP may be driven in various methods, such as a capacitive method, a resistive film method, an infrared ray method, a sonic method, or a pressure method, however, it should not be particularly limited. In the present embodiment, the input sensor ISP driven in the capacitive method will be described as a representative example.

The display device DD may include an active area AA and a peripheral area NAA defined adjacent to the active area AA. Light emitting elements of the display panel DP or sensing electrodes of the input sensor ISP may be disposed in the active area AA, and the display device DD may be activated in response to electrical signals to display the image IM in the active area AA or may sense the external input TC in the active area AA. A driving circuit, a signal line, and a pad may be disposed in the peripheral area NAA to drive elements in the active area AA.

The active area AA may overlap the image area IA of the electronic device ELD, and the peripheral area NAA may overlap the bezel area BZA of the electronic device ELD. Components disposed in the peripheral area NAA may be prevented from being viewed from the outside by the bezel area BZA.

The display device DD may further include a main circuit board MCB, a flexible circuit film FCB, a data driver DIC, a sensor control circuit T-IC, and a main controller 100.

The main circuit board MCB may include a plurality of driving elements. The main circuit board MCB may be electrically connected to the display panel DP and the input sensor ISP via the flexible circuit film FCB. The main circuit board MCB may be electrically connected to the electronic module EM via a connector.

The flexible circuit film FCB may be connected to the display panel DP to electrically connect the display panel DP to the main circuit board MCB. The input sensor ISP may be electrically connected to the display panel DP and may be electrically connected to the main circuit board MCB via the flexible circuit film FCB, however, the present disclosure should not be limited thereto or thereby. According to an embodiment, the input sensor ISP may be electrically connected to the main circuit board MCB via an additional flexible circuit film, or the flexible circuit film FCB may be omitted and the main circuit board MCB may be directly connected to the display panel DP.

Each of the data driver DIC, the sensor control circuit T-IC, and the main controller 100 may be provided in an integrated chip. The data driver DIC may be mounted on the display panel DP, and the sensor control circuit T-IC and the main controller 100 may be mounted on the main circuit board MCB, however, the present disclosure should not be limited thereto or thereby. According to an embodiment, the data driver DIC may be mounted on the flexible circuit film FCB.

The main controller 100 may control an overall operation of the electronic device ELD. For example, the main controller 100 may control an operation of the display panel DP and the input sensor ISP. In addition, the main controller 100 may control an operation of the electronic module EM. The main controller 100 may include at least one microprocessor.

The data driver DIC may include a driving circuit to drive pixels of the display panel DP. The data driver DIC may receive image data and control signals from the main controller 100. As an example, the control signals may include an input vertical synchronization signal, an input horizontal synchronization signal, a main clock, and a data enable signals The sensor control circuit T-IC may provide electrical signals to the input sensor ISP to drive the input sensor ISP. The sensor control circuit T-IC may receive a control signal such as a clock signal from the main controller 100.

The electronic module EM may include a variety of functional modules to drive the display device DD. As an example, the electronic module EM may include a wireless communication module, an image input module, an audio input module, an audio output module, a memory, an external interface module, and the like. The modules of the electronic module EM may be mounted on the main circuit board MCB or may be electrically connected to the main circuit board MCB via a separate flexible circuit board.

The power module PSM may be electrically connected to the electronic module EM. The power module PSM may supply a power required for an overall operation of the electronic device ELD. As an example, the power module PSM may include a conventional battery.

The case EDC may be coupled with the window WM to define an exterior of the electronic device ELD. The window WM may be coupled with the case EDC to form an inner space to accommodate components of the electronic device ELD. The display device DD, the flexible circuit film FCB, the main circuit board MCB, the electronic module EM, and the power module PSM may be accommodated in the inner space. The display panel DP may be bent to allow the flexible circuit film FCB and the main circuit board MCB to face a rear surface of the display device DD and then may be accommodated in the case EDC.

The case EDC may include a material with a relatively high rigidity. As an example, the case EDC may include a frame or a plate formed of glass, plastic, metal material, or combinations thereof. The case EDC may absorb external impacts applied thereto from the outside and may prevent a foreign substance or moisture from entering therein to protect the display device DD.

Figure 3A:
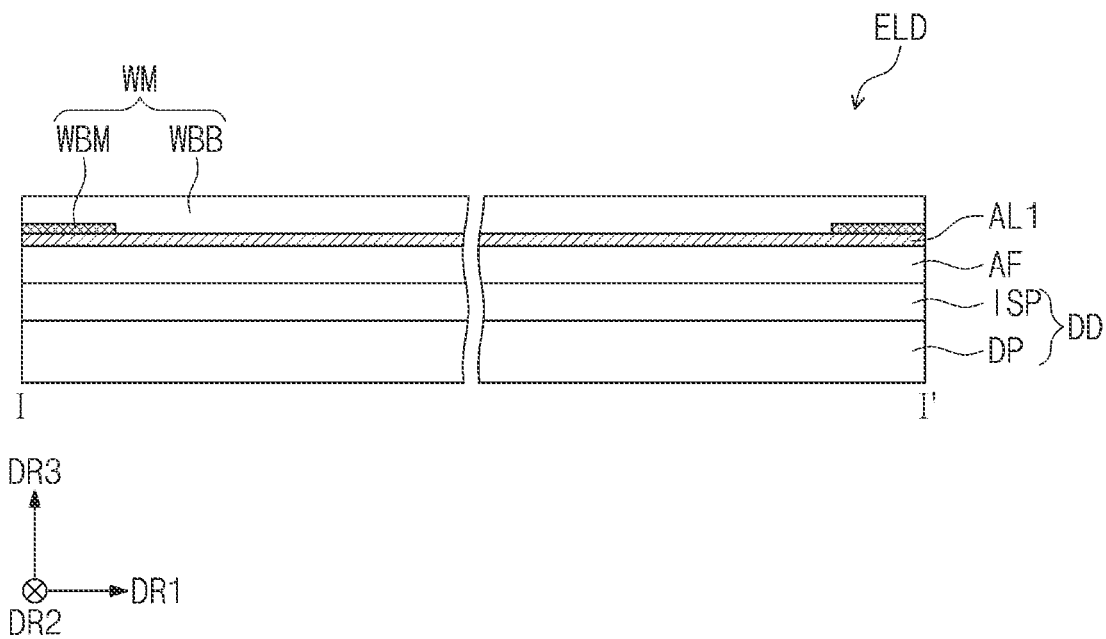
FIGS. 3A and 3B are cross-sectional views of electronic devices taken along a line I-I' of FIG. 2.
Figure 3B:
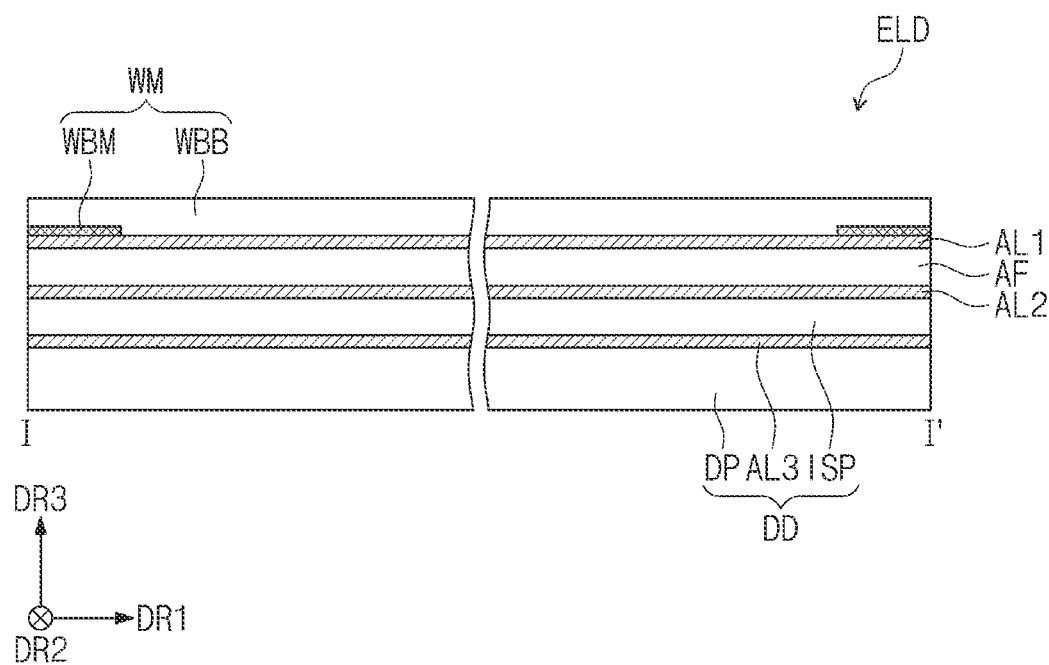

FIGS. 3A and 3B are cross-sectional views of electronic devices taken along a line I-I' of FIG. 2. FIGS. 3A and 3B show various embodiments according to a stack structure of components included in the electronic device ELD, and details of the window WM, the display panel DP, and the input sensor ISP described with reference to FIGS. 1 and 2 may be applied to those of FIGS. 3A and 3B.

Referring to FIGS. 3A and 3B, the window WM may include a base film WBB and a bezel pattern WBM. The base film WBB may include an optically transparent insulating material. The base film WBB may include at least one of a glass film and a synthetic resin film. The base film WBB may have a single-layer structure or a multi-layer structure of two or more films attached to each other. The window WM may further include functional layers, such as an anti-fingerprint layer, a phase control layer, a hard coating layer, etc., disposed on the base film WBB.

The bezel pattern WBM may be a colored layer formed on a surface of the base film WBB. The bezel pattern WBM may include a material with a predetermined color. As an example, the bezel pattern WBM may include a colored organic layer. The bezel pattern WBM may have a single-layer or multi-layer structure. The bezel pattern WBM having the multi-layer structure may include a chromatic color layer and a light blocking layer having an achromatic color, e.g., a black color. The bezel pattern WBM may be formed through a depositing, printing, or coating process.

The bezel pattern WBM may be disposed to correspond to the bezel area BZA (refer to FIG. 1) of the electronic device ELD. An area of the window WM in which the bezel pattern WBM is disposed may have a light transmittance lower than that of an area in which the bezel pattern WBM is not disposed.

A first adhesive layer AL1 may be disposed between the window WM and the optical member AF. The window WM may be coupled with the optical member AF by the first adhesive layer AL1, however, the present disclosure should not be limited thereto or thereby. According to an embodiment, the first adhesive layer AL1 may be omitted, and the window WM may be disposed directly on the optical member AF.

Referring to FIG. 3A, the input sensor ISP may be disposed directly on the display panel DP. The input sensor ISP may be formed on a base surface provided by the display panel DP through successive processes in a manufacturing process of the display device DD. The input sensor ISP may be coupled integrally with the display panel DP without a separate adhesive.

Referring to FIG. 3A, the optical member AF may be disposed directly on the display device DD. As an example, the optical member AF may be formed on an upper surface of the input sensor ISP through successive processes. The optical member AF may include a color filter, and the optical member AF may be formed by coating, patterning, or printing a composition for the color filter on a base surface provided by the input sensor ISP.

However, the present disclosure should not be limited thereto or thereby, and referring to FIG. 3B, the optical member AF may be coupled with the display device DD by a second adhesive layer AL2. As an example, the optical member AF may be provided in the form of a film, such as a polarizing film, and may be coupled with the display device DD by the second adhesive layer AL2 disposed on the upper surface of the input sensor ISP.

Referring to FIG. 3B, the display device DD may further include a third adhesive layer AL3 disposed between the input sensor ISP and the display panel DP. The input sensor ISP may be coupled with the display panel DP by the third adhesive layer AL3. As an example, the input sensor ISP may be provided as a touch panel manufactured by a separate process different from the manufacturing process of the display panel DP, and the input sensor ISP may be coupled with the display panel DP by the third adhesive layer AL3 disposed on the upper surface of the display panel DP.

Each of the first, second, and third adhesive layers AL1, AL2, and AL3 may include a transparent adhesive, such as an optically clear adhesive (OCA) film, an optically clear resin (OCR), or a pressure sensitive adhesive (PSA) film, however, the adhesive included in the first, second, and third adhesive layers AL1, AL2, and AL3 should not be limited thereto or thereby.

The stack structure and the stack order of components included in the electronic device ELD shown in FIGS. 3A and 3B are merely examples, and the present disclosure should not be limited thereto or thereby. As an example, the electronic device ELD may further include a protective layer disposed under the display panel DP or the optical member AF may be omitted. In addition, the stack order of the optical member AF and the input sensor ISP may be changed, and the optical member AF may be disposed between the display panel DP and the input sensor ISP.

Figure 4A:
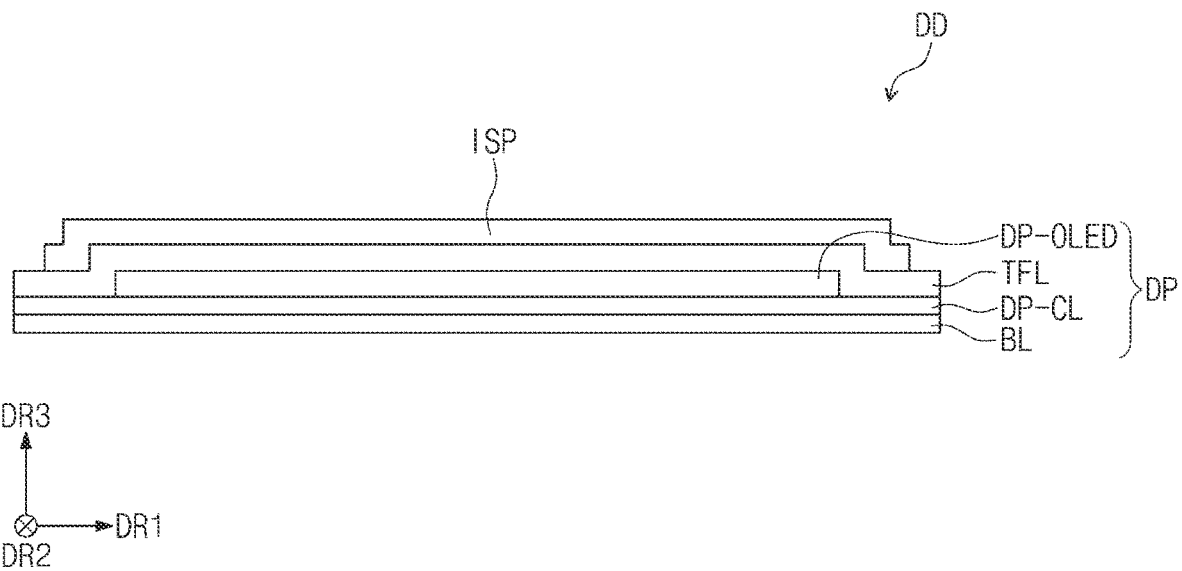
FIGS. 4A, 4B, and 4C are cross-sectional views of display devices according to embodiments of the present disclosure.
Figure 4B:
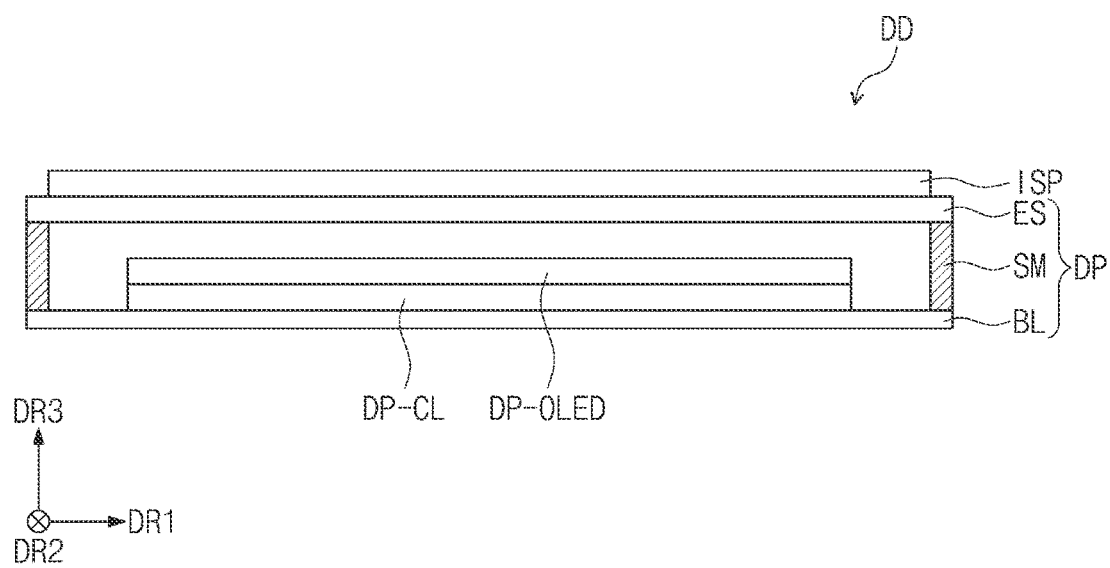
Figure 4C:
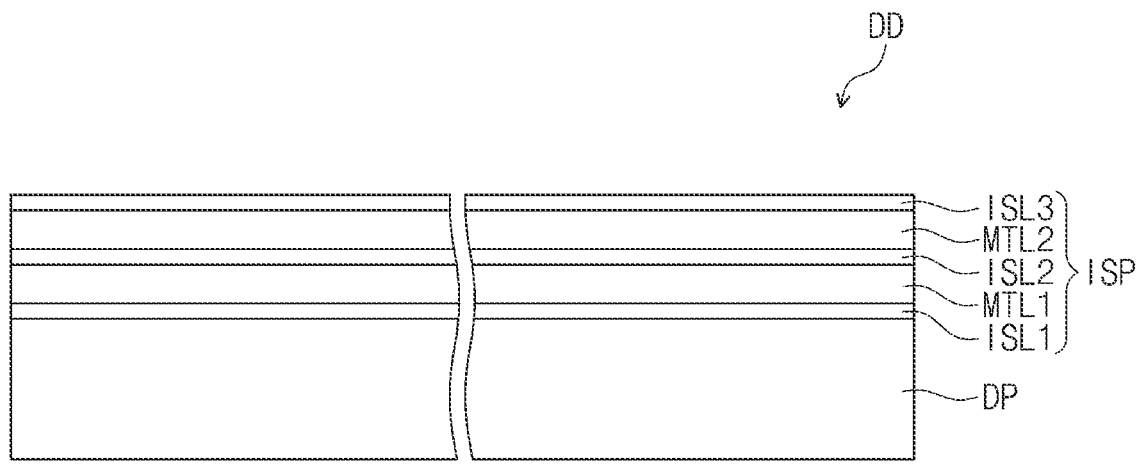
Figure 4C:
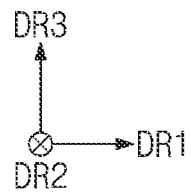

FIGS. 4A to 4C are cross-sectional views of display devices DD according to embodiments of the present disclosure. Details of the display panel DP and the input sensor ISP described above may be applied to a display panel DP and an input sensor ISP of FIGS. 4A to 4C.

Referring to FIG. 4A, the display panel DP may include a base layer BL, a circuit element layer DP-CL, a display element layer DP-OLED, and an encapsulation layer TFL.

The base layer BL may provide a base surface on which the circuit element layer DP-CL is disposed. The base layer BL may be a rigid substrate or a flexible substrate that is bendable, foldable, or rollable. The base layer BL may include a plastic substrate, a glass substrate, a metal substrate, or an organic/inorganic composite material substrate, however, it should not be limited thereto or thereby. The base layer BL may have a multi-layer structure. As an example, the base layer BL may include an inorganic layer, a synthetic resin layer, or a composite material layer.

The circuit element layer DP-CL may be disposed on the base layer BL. The circuit element layer DP-CL may include at least one insulating layer, a semiconductor pattern, and a conductive pattern. An insulating layer, a semiconductor layer, and a conductive layer may be formed by a coating or depositing process. Then, the insulating layer, the semiconductor layer, and the conductive layer may be selectively patterned through several photolithography processes, and thus, the insulating layer, the semiconductor pattern, and the conductive pattern may be formed. The insulating layer, the semiconductor pattern, and the conductive pattern included in the circuit element layer DP-CL may form driving elements, such as transistors, signal lines, and pads in the circuit element layer DP-CL.

The display element layer DP-OLED may be disposed on the circuit element layer DP-CL. The display element layer DP-OLED may include light emitting elements. The light emitting elements of the display element layer DP-OLED may be electrically connected to the driving elements of the circuit element layer DP-CL and may emit a light in response to a signal from the driving elements to display images.

The encapsulation layer TFL may be disposed on the display element layer DP-OLED and may encapsulate the light emitting elements. The encapsulation layer TFL may include at least one thin layer to improve an optical efficiency of the display element layer DP-OLED or to protect the display element layer DP-OLED.

Referring to FIG. 4B, the display panel DP may include a base layer BL, a circuit element layer DP-CL, a display element layer DP-OLED, an encapsulation substrate ES, and a sealant SM.

The circuit element layer DP-CL may be disposed on the base layer BL, and the display element layer DP-OLED may be disposed on the circuit element layer DP-CL.

The sealant SM may be disposed between the base layer BL and the encapsulation substrate ES. The sealant SM may combine the base layer BL with the encapsulation substrate ES. The sealant SM may include an organic adhesive or a frit.

The encapsulation substrate ES may be disposed on the display element layer DP-OLED. Each of the base layer BL and the encapsulation substrate ES may include a plastic substrate, a glass substrate, a metal substrate, or an organic/inorganic composite material substrate. The encapsulation substrate ES may be spaced apart from the display element layer DP-OLED with a predetermined gap in the third direction DR3. According to an embodiment, the display panel DP may further include a filling layer filled in the gap. The filling layer may include a desiccant or resin material.

Referring to FIG. 4C, the input sensor ISP may include a sensor base layer ISL1, a first sensor conductive layer MTL1, a first sensor insulating layer ISL2, a second sensor conductive layer MTL2, and a second sensor insulating layer ISL3. The sensor base layer ISL1 may be disposed directly on the display panel DP, however, it should not be limited thereto or thereby. According to an embodiment, the sensor base layer ISL1 may be omitted, and in this case, the first sensor conductive layer MTL1 may be disposed directly on the display panel DP.

Each of the first and second sensor conductive layers MTL1 and MTL2 may have a single-layer structure or a multi-layer structure. The conductive layer having the multi-layer structure may include a transparent conductive layer or a metal layer, which are stacked in a two or more-layer structure. As an example, the conductive layer having the multi-layer structure may have a structure in which the transparent conductive layer and the metal layer are stacked or metal layers containing different metals are stacked.

The transparent conductive layer included in the first and second sensor conductive layers MTL1 and MTL2 may include indium tin oxide (ITO), indium zinc oxide (IZO), zinc oxide (ZnO), indium tin zinc oxide (ITZO), PEDOT, metal nanowire, or graphene. The metal layer included in the first and second sensor conductive layers MTL1 and MTL2 may include molybdenum, silver, titanium, copper, aluminum, or alloys thereof.

In the first sensor conductive layer MTL1 and the second sensor conductive layer MTL2 each having the multi-layer structure, a metal with relatively high durability and low reflectivity may be applied to an outer layer of the sensor conductive layer, and a metal with high electrical conductivity may be applied to an inner layer of the sensor conductive layer. As an example, each of the first sensor conductive layer MTL1 and the second sensor conductive layer MTL2 may have a three-layer structure of titanium/aluminum/titanium or a three-layer structure of titanium/copper/titanium. The first sensor conductive layer MTL1 and the second sensor conductive layer MTL2 may have lower resistance characteristics when they have the three-layer structure of titanium/copper/titanium than when they have the three-layer structure of titanium/aluminum/titanium.

The first sensor conductive layer MTL1 and the second sensor conductive layer MTL2 may include sensing electrodes TE (refer to FIG. 6) of the input sensor ISP described later and may further include trace lines TL (refer to FIG. 6).

The first sensor insulating layer ISL2 may be disposed on the first sensor conductive layer MTL1. The second sensor insulating layer ISL3 may be disposed on the second sensor conductive layer MTL2. Each of the first sensor insulating layer ISL2 and the second sensor insulating layer ISL3 may include an inorganic layer or an organic layer.

As an example, the inorganic layer may include at least one of aluminum oxide, titanium oxide, silicon oxide, silicon nitride, silicon oxynitride, zirconium oxide, and hafnium oxide. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, a perylene-based resin, and a polyimide-based resin.

Figure 5:
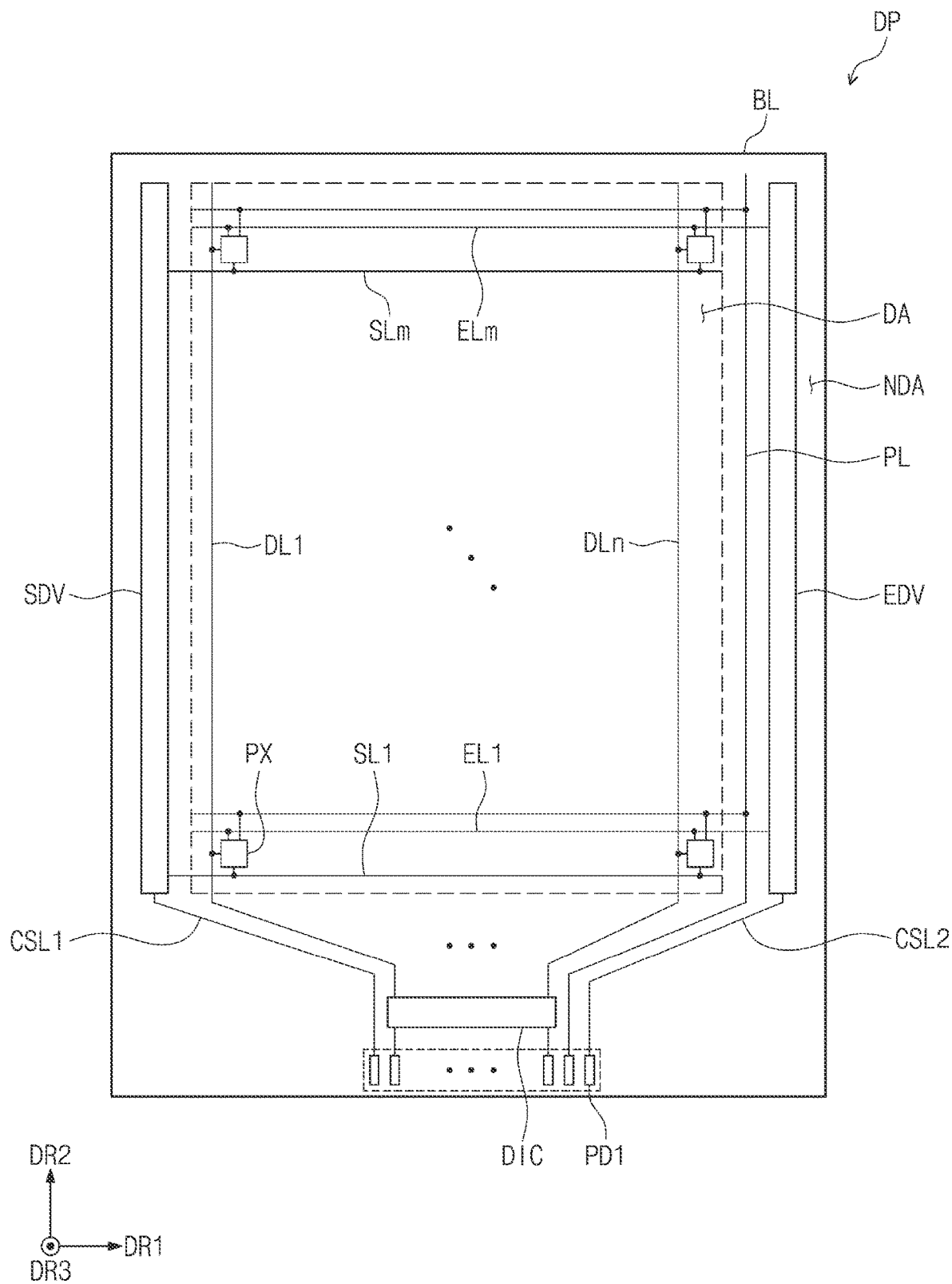
FIG. 5 is a plan view of a display panel according to an embodiment of the present disclosure.

FIG. 5 is a plan view of the display panel DP according to an embodiment of the present disclosure.

Referring to FIG. 5, the display panel DP may include the base layer BL, a plurality of pixels PX, a plurality of signal lines SL1 to SLm, DL1 to DLn, EL1 to ELm, CSL1, CSL2, and PL electrically connected to the pixels PX, a scan driver SDV, the data driver DIC, an emission driver EDV, and a plurality of pads PD1.

The base layer BL may provide a base surface on which elements and lines of the display panel DP are disposed. The base layer BL may include a display area DA and a non-display area NDA. The display area DA may be an area in which the pixels PX are disposed to display the image, and the non-display area NDA may be an area in which elements and lines are disposed to drive the pixels PX and the image is not displayed and may be disposed adjacent to the display area DA. The display area DA may correspond to the active area AA (refer to FIG. 2) of the display device DD, and the non-display area NDA may correspond to the peripheral area NAA (refer to FIG. 2) of the display device DD.

Each of the pixels PX may include a pixel driving circuit including a plurality of transistors, e.g., a switching transistor, a driving transistor, etc., and a capacitor and a light emitting element electrically connected to the pixel driving circuit. Each of the pixels PX may emit a light in response to electrical signals applied thereto.

Each of the scan driver SDV, the data driver DIC, and the emission driver EDV may be disposed in the non-display area NDA, however, the present disclosure should not be limited thereto or thereby. According to an embodiment, at least one of the scan driver SDV, the data driver DIC, and the emission driver EDV may be disposed in the display area DA, and thus, a size of the non-display area NDA may be reduced.

The signal lines SL1 to SLm, DL1 to DLn, EL1 to ELm, CSL1, CSL2, and PL may include a plurality of scan lines SL1 to SLm, a plurality of data lines DL1 to DLn, a plurality of emission lines EL1 to ELm, a first control line CSL1, a second control line CSL2, and a power line PL. Each of m and n is a natural number. Each of the pixels PX may be electrically connected to a corresponding scan line among the scan lines SL1 to SLm, a corresponding data line among the data lines DL1 to DLn, and a corresponding emission line among the emission lines EL1 to ELm. Meanwhile, more types of signal lines may be provided in the display panel DP depending on the configuration of the pixel driving circuit of the pixels PX.

The scan lines SL1 to SLm may extend in the first direction DR1 and may be electrically connected to the scan driver SDV. The data lines DL1 to DLn may extend in the second direction DR2 and may be electrically connected to the data driver DIC. The emission lines EL1 to ELm may extend in the first direction DR1 and may be electrically connected to the emission driver EDV.

The power line PL may include a portion extending in the first direction DR1 and a portion extending in the second direction DR2. The portion of the power line PL extending in the first direction DR1 and the portion of the power line PL extending in the second direction DR2 may be disposed on different layers from each other and may be connected to each other via a contact hole, however, they should not be limited thereto or thereby. According to an embodiment, the portion of the power line PL extending in the first direction DR1 and the portion of the power line PL extending in the second direction DR2 may be disposed on the same layer and may be provided integrally with each other.

The portion of the power line PL extending in the first direction DR1 may extend to the display area DA and may be electrically connected to the pixels PX, and the portion of the power line PL extending in the second direction DR2 may disposed in the non-display area NDA and may extend to the pads PD1. The power line PL may receive a power supply voltage and may provide the power supply voltage to the pixels PX.

The first control line CSL1 may be electrically connected to the scan driver SDV. The second control line CSL2 may be electrically connected to the emission driver EDV.

The pads PD1 may be disposed adjacent to a lower end of the non-display area NDA. The pads PD1 may be disposed closer to a lower end of the display panel DP than the data driver DIC is. The pads PD1 may be arranged spaced apart from each other in the first direction DR1. The pads PD1 may be electrically connected to a circuit board that provides a signal to control an operation of the scan driver SDV, the data driver DIC, and the emission driver EDV.

Corresponding pads PD1 may be connected to corresponding signal lines among the signal lines SL1 to SLm, DL1 to DLn, EL1 to ELm, CSL1, CSL2, and PL. As an example, the power line PL, the first and second control lines CSL1 and CSL2, and the data lines DL1 to DLn may be connected to corresponding pads PD1. The data lines DL1 to DLn may be connected to the corresponding pads PD1 via the data driver DIC.

The scan driver SDV may generate a plurality of scan signals in response to a scan control signal. The scan signals may be applied to the pixels PX via the scan lines SL1 to SLm. The data driver DIC may generate a plurality of data voltages corresponding to image signals in response to a data control signal. The data voltages may be applied to the pixels PX via the data lines DL1 to DLn. The emission driver EDV may generate a plurality of emission signals in response to an emission control signal. The emission signals may be applied to the pixels PX via the emission lines EL1 to ELm.

The pixels PX may receive the data voltages in response to the scan signals. The pixels PX may emit a light having a luminance corresponding to the data voltages in response to the emission signals, and thus, the image may be displayed. An emission time of the pixels PX may be controlled by the emission signals. Accordingly, the display panel DP may display the image through the display area DA using the pixels PX.

Figure 6:
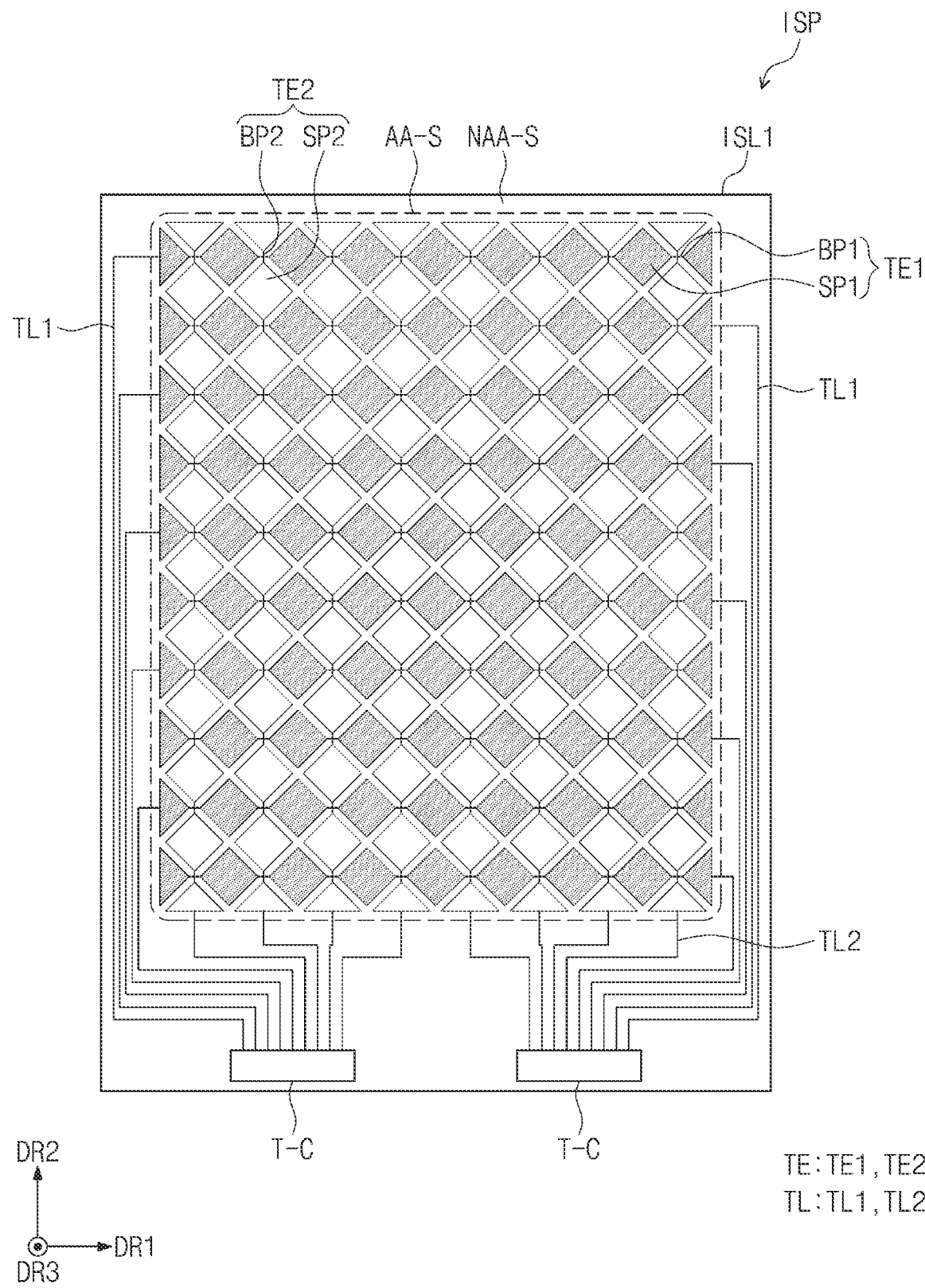
FIG. 6 is a plan view of an input sensor according to an embodiment of the present disclosure.

FIG. 6 is a plan view of the input sensor ISP according to an embodiment of the present disclosure.

Referring to FIG. 6, the input sensor ISP may include a sensing area AA-S and a non-sensing area NAA-S defined adjacent to the sensing area AA-S. The sensing area AA-S may correspond to the active area AA (refer to FIG. 2) of the display device DD (refer to FIG. 2). The sensing electrodes TE of the input sensor ISP may be disposed in the sensing area AA-S and may sense the external input TC (refer to FIG. 1). The non-sensing area NAA-S may correspond to the peripheral area NAA (refer to FIG. 2) of the display device DD (refer to FIG. 2). Elements and lines may be disposed in the non-sensing area NAA-S to drive the sensing electrodes TE disposed in the sensing area AA-S.

The input sensor ISP may include the sensing electrodes TE, the trace lines TL, and a sensing controller T-C, which are disposed on the sensor base layer ISL1.

The sensing electrodes TE may include first sensing electrodes TE1 and second sensing electrodes TE2 electrically insulated from the first sensing electrodes TE1 while intersecting the first sensing electrodes TE1 when viewed in the plane. The input sensor ISP may obtain information about the external input based on a variation in mutual capacitance between the first sensing electrodes TE1 and the second sensing electrodes TE2.

Each of the first sensing electrodes TE1 may extend in the first direction DR1, and the first sensing electrodes TE1 may be arranged in the second direction DR2. The first sensing electrodes TE may be arranged in a plurality of rows arranged in the second direction DR2. FIG. 6 shows ten first sensing electrodes TE1 as a representative example, however, the number of the first sensing electrodes TE1 included in the input sensor ISP should not be limited thereto or thereby.

Each of the second sensing electrodes TE2 may extend in the second direction DR2, and the second sensing electrodes TE2 may be arranged in the first direction DR1. The second sensing electrodes TE2 may be arranged in a plurality of columns arranged in the first direction DR1. FIG. 6 shows eight second sensing electrodes TE2 as a representative example, however, the number of the second sensing electrodes TE2 included in the input sensor ISP should not be limited thereto or thereby.

Each of the first sensing electrodes TE1 may include first sensing patterns SP1 and first connection patterns BP1. The first sensing patterns SP1 may be arranged in the first direction DR1. The first connection patterns BP1 may connect the first sensing patterns SP1 adjacent to each other in the first direction DR1. The first connection patterns BP1 may be disposed on the same layer as the first sensing patterns SP1, may extend from the first sensing patterns SP1 when viewed in the plane, and may be provided integrally with the first sensing patterns SP1. The first sensing patterns SP1 and the first connection patterns BP1 may be formed of the same conductive layer by patterning the conductive layer through the same process. However, the first connection patterns BP1 should not be particularly limited as long as the first connection patterns BP1 electrically connect the first sensing patterns SP1 adjacent to each other in the first direction DR1.

Each of the second sensing electrodes TE2 may include second sensing patterns SP2 and second connection patterns BP2. The second sensing patterns SP2 may be arranged in the second direction DR2. The second connection patterns BP2 may connect the second sensing patterns SP2 adjacent to each other in the second direction DR2. The second connection patterns BP2 may be disposed on a different layer from the second sensing patterns SP2 and may be connected to corresponding second sensing patterns SP2 through contact holes. The second sensing patterns SP2 spaced apart from each other in the second direction DR2 may be electrically connected to each other through the second connection patterns BP2. The second connection patterns BP2 disposed on a different layer from the second sensing patterns SP2 and electrically connecting the second sensing patterns SP2 may be defined as bridge patterns.

According to an embodiment, the first sensing patterns SP1, the first connection patterns BP1, and the second sensing patterns SP2 may be disposed on the same layer. The second connection patterns BP2 and the second sensing patterns SP2 may be disposed on different layers from each other. As an example, the first sensing patterns SP1, the first connection patterns BP1, and the second sensing patterns SP2 may be included in the second sensor conductive layer MTL2 (refer to FIG. 4C), and the second connection patterns BP2 may be included in the first sensor conductive layer MTL1 (refer to FIG. 4C), however, the present disclosure should not be limited thereto or thereby. According to an embodiment, the first sensing patterns SP1, the first connection patterns BP1, and the second sensing patterns SP2 may be included in the first sensor conductive layer MTL1 (refer to FIG. 4C), and the second connection patterns BP2 may be included in the second sensor conductive layer MTL2 (refer to FIG. 4C). According to an embodiment, the first sensing patterns SP1, the second sensing patterns SP2, and the second connection patterns BP2 may be disposed on the same layer, and the first connection patterns BP1 and the first sensing patterns SP1 may be disposed on different layers from each other.

The trace lines TL may include first trace lines TL1 and the second trace lines TL2. Each of the first trace lines TL1 may be connected to the first sensing electrodes TE1. Each of the first trace lines TL1 may be connected to the first sensing electrodes TE1 arranged in a corresponding row among the first sensing electrodes TE1 arranged in the plural rows. Each of the second trace lines TL2 may be connected to the second sensing electrodes TE2. Each of the second trace lines TL2 may be connected to the second sensing electrodes TE2 arranged in a corresponding column among the second sensing electrodes TE2 arranged in the plural columns.

The second trace lines TL2 may be respectively connected to lower ends of the second sensing electrodes TE2 adjacent to the sensing controller T-C. Each of the second trace lines TL2 may extend from the lower end of the corresponding second sensing electrode TE2 in the non-sensing area NAA-S and may be connected to the sensing controller T-C.

The first trace lines TL1 may be connected to left or right ends of the first sensing electrodes TE1. As an example, among the first trace lines TL1, each of the first trace lines TL1 connected to the first sensing electrodes TE1 arranged in an odd-numbered row may be connected to the left end of the corresponding first sensing electrode TE1 among the first sensing electrodes TE1 arranged in the odd-numbered row. Among the first trace lines TL1, each of the first trace lines TL1 connected to the first sensing electrodes TE1 arranged in an even-numbered row may be connected to the right end of the corresponding first sensing electrode TE1 among the first sensing electrodes TE1 arranged in the even-numbered row. Each of the first trace lines TL1 may extend from the left or right end of the corresponding first sensing electrode TE1 to a direction parallel to the first direction DR1 and a direction parallel to the second direction DR2 in the non-sensing area NAA-S and may be connected to the sensing controller T-C.

The first trace lines TL1 may be disposed on a different layer from at least a portion of the second sensing electrodes TE2. As an example, the first trace lines TL1 may be disposed on a different layer from the second sensing patterns SP2. According to an embodiment, the first trace lines TL1 may be included in the first sensor conductive layer MTL1 (refer to FIG. 4C), and the second sensing patterns SP2 may be included in the second sensor conductive layer MTL2 (refer to FIG. 4C), however, the present disclosure should not be limited thereto or thereby.

The sensing controller T-C may be disposed in the non-sensing area NAA-S. The sensing controller T-C may be disposed closer to a lower end of the sensor base layer ISL1. The sensing controller T-C may be electrically connected to the trace lines TL. The sensing controller T-C may apply a signal to the sensing electrodes TE through the trace lines TL or may receive a signal from the sensing electrodes TE through the trace lines TL. The sensing controller T-C may include a controller and may generate coordinate values for a location to which the external input is provided based on the signal received from the sensing electrodes TE. However, the present disclosure should not be limited thereto or thereby. According to an embodiment, the sensing controller T-C may include sensing pads disposed spaced apart from each other and respectively connected to the trace lines TL, and the sensing pads may be electrically connected to a circuit board providing a driving signal.

Driving signals to drive the first sensing electrodes TE1 and the second sensing electrodes TE2 may be applied to the first sensing electrodes TE1 and the second sensing electrodes TE2 from the sensing controller T-C through the second trace lines TL2. Signals including information sensed by the first sensing electrodes TE1 and the second sensing electrodes TE2 may be output through the first trace lines TL1, however, the present disclosure should not be limited thereto or thereby.

Figure 7A:
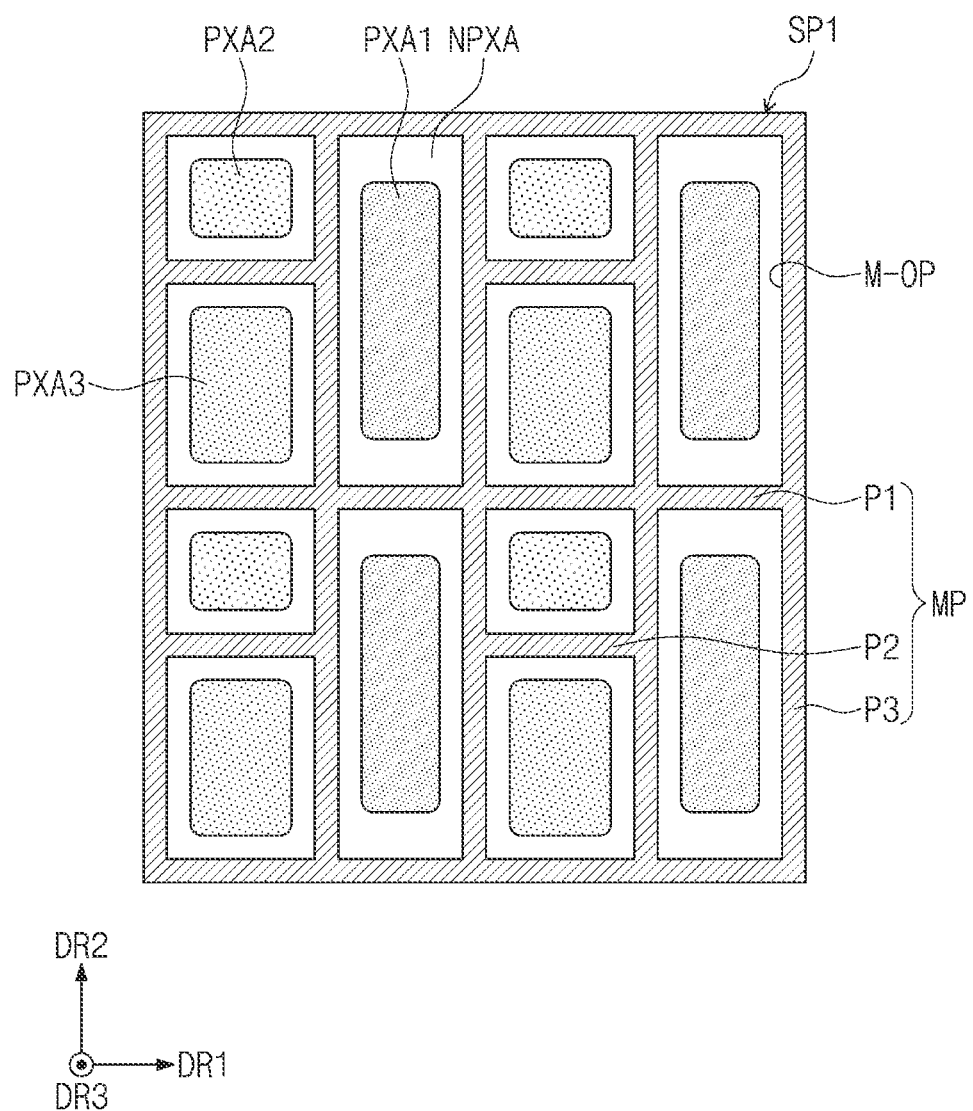
FIGS. 7A and 7B are enlarged plan views of sensing patterns according to embodiments of the present disclosure.
Figure 7B:
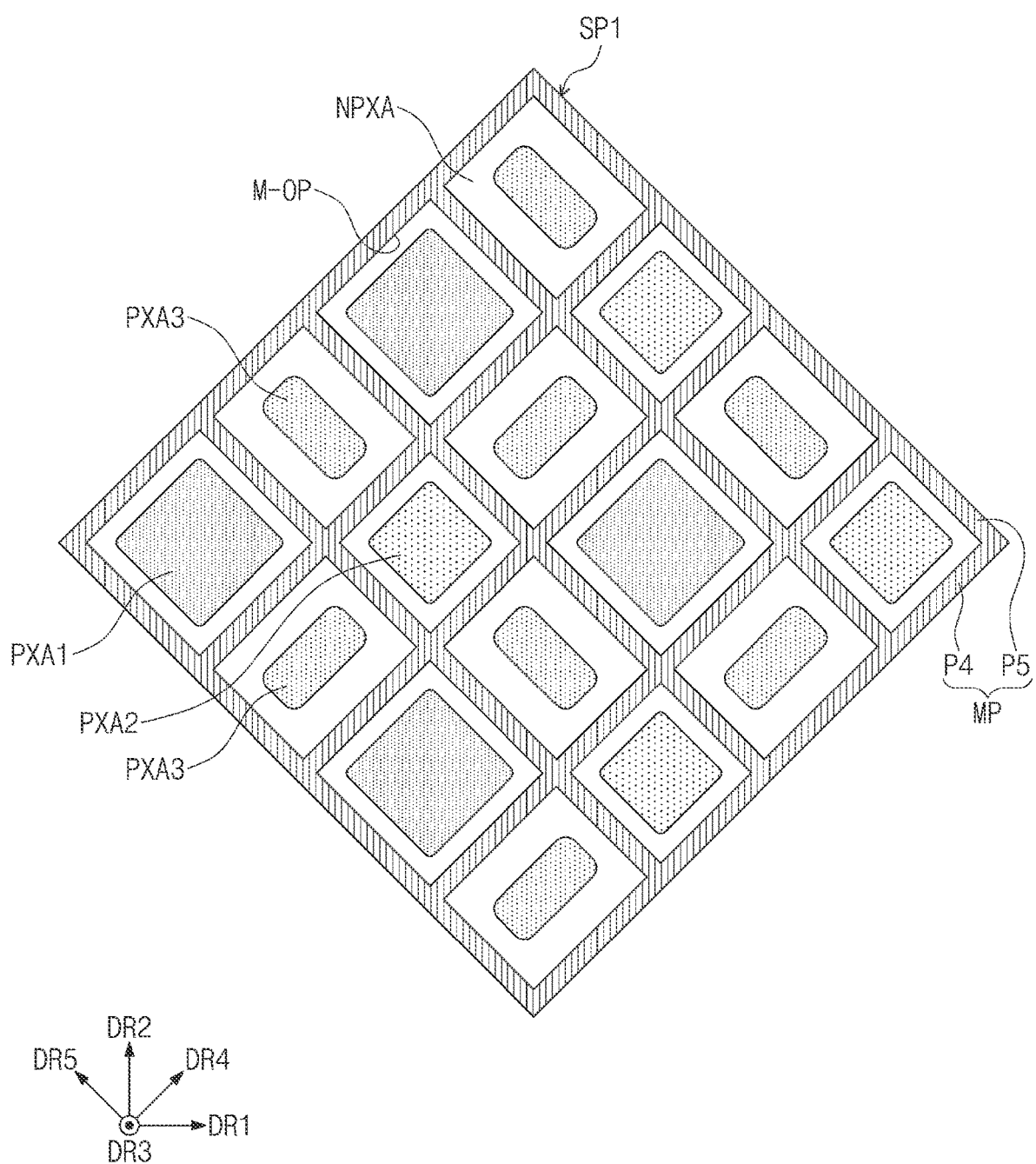

FIGS. 7A and 7B are enlarged plan views of sensing patterns SP1 according to embodiments of the present disclosure. FIGS. 7A and 7B show a portion of the first sensing pattern SP1, and detailed descriptions of the first sensing pattern SP1 may be applied to the second sensing pattern SP2 (refer to FIG. 6). Hereinafter, the first sensing pattern SP1 will be referred to as the sensing pattern SP1.

The display panel DP (refer to FIG. 2) may include light emitting areas PXA1, PXA2, and PXA3 and a non-light-emitting area NPXA surrounding the light emitting areas PXA1, PXA2, and PXA3. For the convenience of explanation, FIGS. 7A and 7B show the light emitting areas PXA1, PXA2, and PXA3 and the non-light-emitting area NPXA, which overlap the sensing pattern SP1.

The light emitting areas PXA1, PXA2, and PXA3 may include a first light emitting area PXA1, a second light emitting area PXA2, and a third light emitting area PXA3. The first, second, and third light emitting areas PXA1, PXA2, and PXA3 may be distinguished from each other according to colors of lights emitted from the light emitting areas. The first light emitting area PXA1 may emit a first color light, the second light emitting area PXA2 may emit a second color light, the third light emitting area PXA3 may emit a third color light, and the first, second, and third color lights may be different from each other. As an example, the first color light may be a blue light, the second color light may be a red light, and the third color light may be a green light, however, the present disclosure should not be limited thereto or thereby.

The non-light-emitting area NPXA may surround the first, second, and third light emitting areas PXA1, PXA2, and PXA3. The non-light-emitting area NPXA may define a boundary between the first, second, and third light emitting areas PXA1, PXA2, and PXA3. Accordingly, the non-light-emitting area NPXA may prevent a color mixture between the first, second, and third light emitting areas PXA1, PXA2, and PXA3.

The first, second, and third light emitting areas PXA1, PXA2, and PXA3 may have sizes designed in various ways depending on the colors of the emitted lights and a resolution of the display panel DP (refer to FIG. 2). The first, second, and third light emitting areas PXA1, PXA2, and PXA3 may have different sizes from each other. As an example, the first light emitting area PXA1 may have the largest size among the first, second, and third light emitting areas PXA1, PXA2, and PXA3.

Each of the first, second, and third light emitting areas PXA1, PXA2, and PXA3 may have a variety of shapes, such as a polygonal shape, a circular shape, or an oval shape, when viewed in the plane. In the present embodiment, the term "polygonal shape" as used herein may include a polygonal shape in a mathematical meaning and a polygonal shape whose vertices are curved. The shape of the first, second, and third light emitting areas PXA1, PXA2, and PXA3 may correspond to a light emitting opening PX-OP (refer to FIG. 8A) defined through a pixel definition layer PDL (refer to FIG. 8A), and the shape of vertices may vary depending on etching characteristics of the pixel definition layer PDL (refer to FIG. 8A).

The first sensing electrodes TE1 (refer to FIG. 6) and the second sensing electrodes TE2 (refer to FIG. 6) may include a mesh pattern MP through which mesh openings M-OP are defined. The mesh openings M-OP may overlap the first, second, and third light emitting areas PXA1, PXA2, and PXA3. The mesh pattern MP may not overlap the first, second, and third light emitting areas PXA1, PXA2, and PXA3 and may overlap the non-light-emitting area NPXA. Accordingly, light emitting efficiency of the display panel DP in the first, second, and third light emitting areas PXA1, PXA2, and PXA3 may not be deteriorated.

As the first sensing electrodes TE1 (refer to FIG. 6) include the mesh pattern MP, a parasitic capacitance between the first sensing electrodes TE1 and a second electrode CE (refer to FIG. 8A) of the display panel DP (refer to FIG. 8A) may be reduced more than when the mesh opening M-OP is not provided in the first sensing electrodes TE1. As the second sensing electrodes TE2 (refer to FIG. 6) include the mesh pattern MP, a parasitic capacitance between the second sensing electrodes TE2 and the second electrode CE (refer to FIG. 8A) of the display panel DP (refer to FIG. 8A) may be reduced more than when the mesh opening M-OP is not provided in the second sensing electrodes TE2. As a result, a touch sensitivity of the input sensor ISP may be improved.

Each of the first light emitting area PXA1, the second light emitting area PXA2, and the third light emitting area PXA3 may be provided in plural, and each of the first light emitting areas PXA1, the second light emitting areas PXA2, and the third light emitting areas PXA3 may be arranged in a predetermined arrangement. The arrangement and size of the mesh openings M-OP may be changed in various ways depending on the arrangement and size of the first, second, and third light emitting areas PXA1, PXA2, and PXA3, and thus, the shape of the mesh pattern MP may vary corresponding to the arrangement and size of the first, second, and third light emitting areas PXA1, PXA2, and PXA3.

Referring to FIG. 7A, each of the first light emitting area PXA1 and the third light emitting area PXA3 may extend in the direction parallel to the second direction DR2. Each of the first light emitting area PXA1 and the third light emitting area PXA3 may include long sides extending in the direction parallel to the second direction DR2. A length in the second direction DR2 of the first light emitting area PXA1 may be greater than a length in the second direction DR2 of the third light emitting area PXA3. The second light emitting area PXA2 may include long sides extending in the direction parallel to the first direction DR1. A length in the second direction DR2 of the second light emitting area PXA2 may be smaller than the length in the second direction DR2 of each of the first light emitting area PXA1 and the third light emitting area PXA3.

Each of the first, second, and third light emitting areas PXA1, PXA2, and PXA3 may be provided in plural. The second light emitting areas PXA2 and the third light emitting areas PXA3 may be alternately arranged in the direction parallel to the second direction DR2 to form a first column, and the first light emitting areas PXA1 may be arranged in the direction parallel to the second direction DR2 to form a second column. The first column may be alternately arranged with the second column in the first direction DR1. Each of the first light emitting areas PXA1 may overlap at least a portion of each of the second light emitting area PXA2 and the third light emitting area PXA3 when viewed in the first direction DR1.

The mesh pattern MP may include a first line portion P1, a second line portion P2, and a third line portion P3. The first, second, and third line portions P1, P2, and P3 may have an integral shape. The first, second, and third line portions P1, P2, and P3 may be connected to each other and may define the mesh openings M-OP overlapping the first, second, and third light emitting areas PXA1, PXA2, and PXA3. The first, second, and third line portions P1, P2, and P3 may be formed by patterning a conductive layer to form the mesh openings M-OP through the conductive layer. The first, second, and third line portions P1, P2, and P3 may be disposed in the non-light-emitting area NPXA and may have a shape surrounding the first, second, and third light emitting areas PXA1, PXA2, and PXA3.

The first line portion P1 and the second line portion P2 may correspond to portions of the mesh pattern MP, which extend in the first direction DR1. The first line portion P1 may be disposed between the first light emitting areas PXA1 facing each other in the second direction DR2 and between the second light emitting area PXA2 and the third light emitting area PXA3 facing the second light emitting area PXA2 in the second direction DR2. The second line portion P2 may overlap the first light emitting area PXA1 when viewed in the first direction DR1 and may be disposed between the second light emitting area PXA2 and the third light emitting area PXA3 adjacent to the second light emitting area PXA2 in the second direction DR2.

The third line portion P3 may correspond to a portion of the mesh pattern MP, which extends in the direction parallel to the second direction DR2. The third line portion P3 may extend from the first line portion P1 to the direction parallel to the second direction DR2. The third line portion P3 may be disposed between the first light emitting area PXA1 and the second light emitting area PXA2, which are adjacent to each other in the first direction DR1, and between the first light emitting area PXA1 and the third light emitting area PXA3, which are adjacent to each other in the first direction DR1.

Referring to FIG. 7B, each of a first light emitting area PXA1 and a second light emitting area PXA2 may have a substantially square shape when viewed in the plane. The sensing pattern SP1 may include two types of third light emitting areas PXA3 with long sides extending in different directions. The third light emitting area PXA3 may include the long sides extending in a fourth direction DR4 or a fifth direction DR5.

In the present embodiment, the fourth direction DR4 may intersect each of the first direction DR1 and the second direction DR2 when viewed in the plane defined by the first direction DR1 and the second direction DR2. The fifth direction DR5 may intersect each of the first direction DR1, the second direction DR2, and the fourth direction DR4 when viewed in the plane defined by the first direction DR1 and the second direction DR2.

Each of the first, second, and third light emitting areas PXA1, PXA2, and PXA3 may be provided in plural. The first light emitting areas PXA1 and the second light emitting areas PXA2 may be alternately arranged in the first direction DR1 and the second direction DR2. The first light emitting areas PXA1 and the third light emitting areas PXA3 extending in the fifth direction DR5 may be alternately arranged with each other in the fourth direction DR4, and the first light emitting areas PXA1 and the third light emitting areas PXA3 extending in the fourth direction DR4 may be alternately arranged with each other in the fifth direction DR5. The second light emitting areas PXA2 and the third light emitting areas PXA3 extending in the fourth direction DR4 may be alternately arranged with each other in the fourth direction DR4, and the second light emitting areas PXA2 and the third light emitting areas PXA3 extending in the fifth direction DR5 may be alternately arranged with each other in the fifth direction DR5.

The mesh pattern MP may include a fourth line portion P4 and a fifth line portion P5. The fourth line portion P4 and the fifth line portion P5 may be connected to each other to have an integral shape and may define mesh openings M-OP overlapping the first, second, and third light emitting areas PXA1, PXA2, and PXA3. The fourth line portion P4 and the fifth line portion P5 may be formed by patterning a conductive layer to form the mesh openings M-OP through the conductive layer. The fourth line portion P4 and the fifth line portion P5 may be disposed in a non-light-emitting area NPXA and may have a shape surrounding the first, second, and third light emitting areas PXA1, PXA2, and PXA3.

The fourth line portion P4 may correspond to a portion of the mesh pattern MP, which extends in the fourth direction DR4. The fifth line portion P5 may correspond to a portion of the mesh pattern MP, which extends in the fifth direction DR5. The fourth line portion P4 may be alternately arranged with the fifth line portion P5 when viewed in the plane.

Meanwhile, the arrangement and the shape of the light emitting areas PXA1, PXA2, and PXA3 and the shape of the mesh pattern MP shown in FIGS. 7A and 7B are merely examples, and the present disclosure should not be limited thereto or thereby.

Figure 8A:
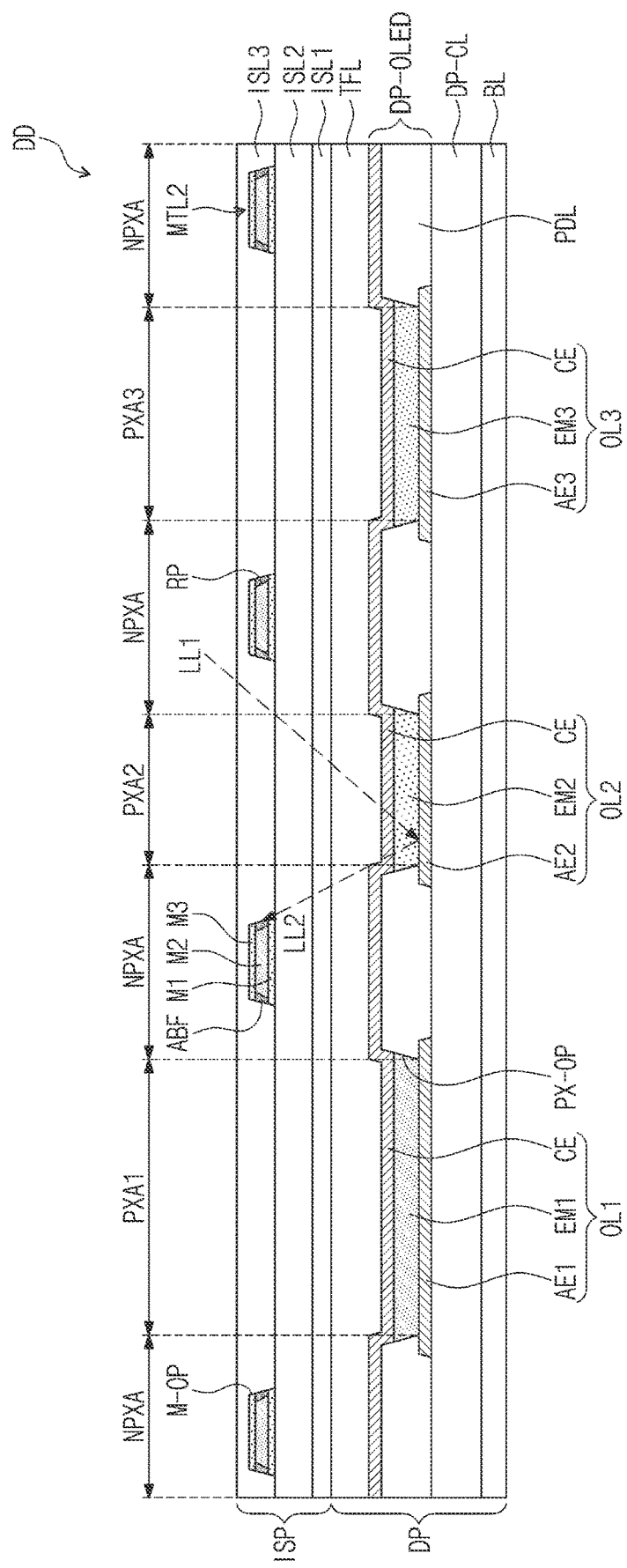
FIGS. 8A and 8B are cross-sectional views of a display device according to an embodiment of the present disclosure.
Figure 8B:
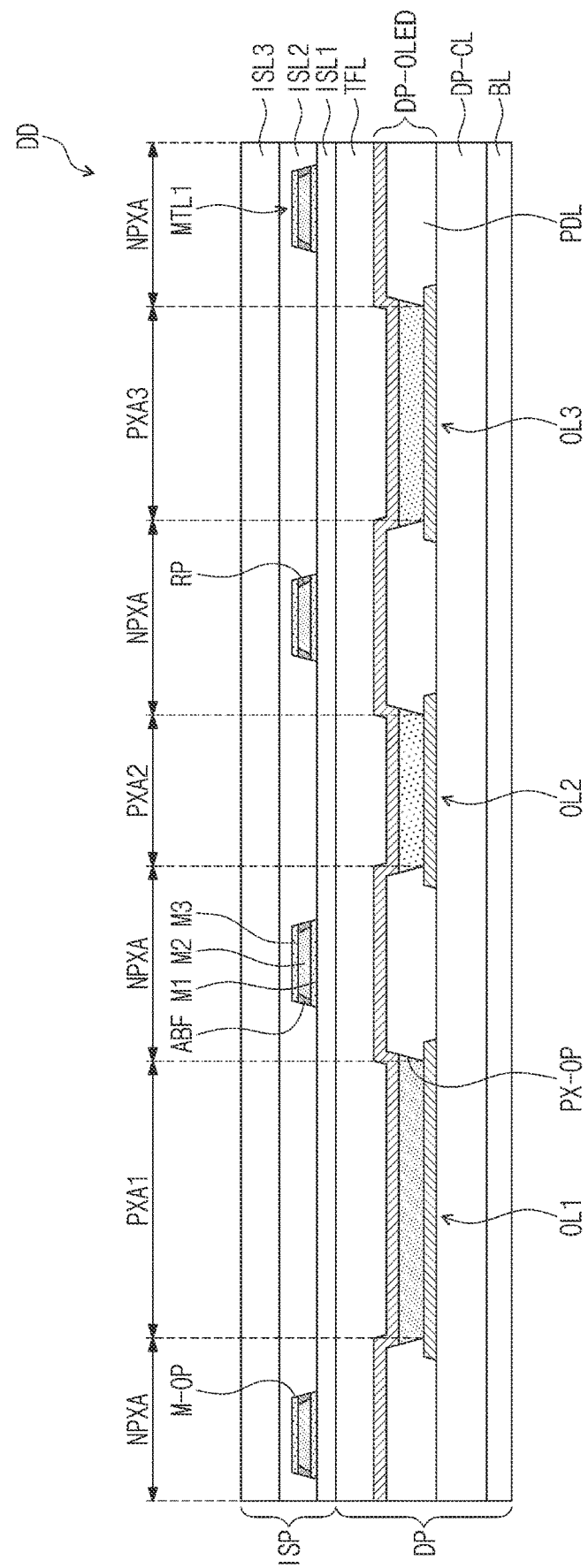

FIGS. 8A and 8B are cross-sectional views of the display device DD according to an embodiment of the present disclosure. FIG. 8C is a cross-sectional view of a display device DD' according to a comparative example.

Referring to FIGS. 8A and 8B, the display panel DP may include the base layer BL, the circuit element layer DP-CL, the display element layer DP-OLED, and the encapsulation layer TFL. Details of the base layer BL, the circuit element layer DP-CL, the display element layer DP-OLED, and the encapsulation layer TFL of the display panel DP described with reference to FIGS. 1 to 7B may be applied to those of FIGS. 8A and 8B.

The display element layer DP-OLED may include a plurality of light emitting elements OL1, OL2, and OL3 and the pixel definition layer PDL. The light emitting elements OL1, OL2, and OL3 may include first, second, and third light emitting elements OL1, OL2, and OL3 respectively corresponding to the first, second, third light emitting areas PXA1, PXA2, and PXA3.

Each of the light emitting elements OL1, OL2, and OL3 may be an organic light emitting element, an inorganic light emitting element, a quantum dot light emitting element, a micro-LED, a nano-LED, a quantum dot light emitting element, an electrophoretic element, or an electrowetting element. However, the light emitting elements OL1, OL2, and OL3 should not be particularly limited as long as the light is generated in response to electrical signals or an amount of the light is controlled by the electrical signals.

Each of the first, second, and third light emitting elements OL1, OL2, and OL3 may include one of first electrodes AE1, AE2, and AE3, one of light emitting layers EML1, EML2, and EML3, and the second electrode CE.

The first electrodes AE1, AE2, and AE3 of the first, second, and third light emitting elements OL1, OL2, and OL3 may be disposed on the circuit element layer DP-CL and may be spaced apart from each other. The first electrodes AE1, AE2, and AE3 of the first, second, and third light emitting elements OL1, OL2, and OL3 may be electrically connected to the driving elements of the corresponding circuit element layer DP-CL, respectively.

Each of the first electrodes AE1, AE2, and AE3 may be a transflective electrode or a reflective electrode. As an example, the first electrodes AE1, AE2, and AE3 may include a reflective layer containing silver (Ag), magnesium (Mg), aluminum (Al), platinum (Pt), palladium (Pd), gold (Au), nickel (Ni), neodymium (Nd), iridium (Ir), chromium (Cr), or a compound thereof and a transparent or semi-transparent electrode layer formed on the reflective layer. The transparent or semi-transparent electrode layer may include zinc oxide (ZnO), indium oxide (IO), indium tin oxide (ITO), indium zinc oxide (IZO), indium gallium zinc oxide (IGZO), or aluminum-doped zin oxide (Al—ZnO).

The pixel definition layer PDL may be provided with the light emitting openings PX-OP defined therethrough. Each of the light emitting openings PX-OP may expose at least a portion of a corresponding first electrode of the first electrodes AE1, AE2, and AE3 of the first, second, and third light emitting elements OL1, OL2, and OL3. Areas of the first electrodes AE1, AE2, and AE3, which are exposed through the light emitting openings PX-OP without being covered by the pixel definition layer PDL, may correspond to the light emitting areas PXA1, PXA2, and PXA3, respectively. The area in which the pixel definition layer PDL is disposed may correspond to the non-light-emitting area NPXA.

The pixel definition layer PDL may have a light absorbing property. The pixel definition layer PDL may have a black color and may include a black coloring agent. The black coloring agent may include a black pigment or a black dye. The black coloring agent may include a metal material, such as carbon black, chrome, etc., or an oxide thereof. However, the pixel definition layer PDL should not be limited thereto or thereby.

The light emitting layers EM1, EM2, and EM3 of the first, second, and third light emitting elements OL1, OL2, and OL3 may be disposed on corresponding first electrodes AE1, AE2, and AE3, respectively. The light emitting layers EM1, EM2, and EM3 of the first, second, and third light emitting elements OL1, OL2, and OL3 may be disposed to correspond to the light emitting openings PX-OP, respectively. Each of the light emitting layers EM1, EM2, and EM3 may emit one of the red light, the green light, and the blue light. However, the colors of the lights emitted from the light emitting layers EM1, EM2, and EM3 should not be limited thereto or thereby. According to an embodiment, the light emitting layers EM1, EM2, and EM3 of the first, second, and third light emitting elements OL1, OL2, and OL3 may be provided as a common layer and may emit the blue or white light as a source light.

The second electrode CE of the first, second, and third light emitting elements OL1, OL2, and OL3 may be disposed on the light emitting layers EM1, EM2, and EM3. The second electrode CE of the first, second, and third light emitting elements OL1, OL2, and OL3 may be a common layer integrally formed to overlap the first, second, third light emitting areas PXA1, PXA2, and PXA3 and the non-light-emitting area NPXA. That is, the second electrode CE of the first, second, and third light emitting elements OL1, OL2, and OL3 may be a common electrode to which a common voltage is applied.

The encapsulation layer TFL may be disposed on the first, second, and third light emitting elements OL1, OL2, and OL3. The encapsulation layer TFL may encapsulate and protect the first, second, and third light emitting elements OL1, OL2, and OL3.

The encapsulation layer TFL may include at least one of an inorganic layer and an organic layer. As an example, the encapsulation layer TFL may include the inorganic layers and the organic layer disposed between the inorganic layers. The inorganic layer of the encapsulation layer TFL may protect the first, second, and third light emitting elements OL1, OL2, and OL3 from moisture and oxygen. The organic layer of the encapsulation layer TFL may protect the first, second, and third light emitting elements OL1, OL2, and OL3 from a foreign substance such as dust particles.

Referring to FIG. 8A, the input sensor ISP may include the sensor base layer ISL1, the first sensor insulating layer ISL2, the second sensor insulating layer ISL3, and the second sensor conductive layer MTL2. Details of the components of the input sensor ISP described with reference to FIGS. 1 to 7B may be applied to those of FIG. 8A.

The second sensor conductive layer MTL2 may include the first sensing electrodes TE1 (refer to FIG. 6) and the second sensing patterns SP2 (refer to FIG. 6). The second sensor conductive layer MTL2 may have the shape corresponding to the shape of the mesh pattern MP (refer to FIGS. 7A and 7B) and may be disposed in the non-light-emitting area NPXA.

The second sensor conductive layer MTL2 may include a plurality of conductive layers M1, M2, and M3. The conductive layers M1, M2, and M3 may include first, second, and third conductive layers M1, M2, and M3. The first conductive layer M1 may be disposed on the first sensor insulating layer ISL2, the second conductive layer M2 may be disposed on the first conductive layer M1, and the third conductive layer M3 may be disposed on the second conductive layer M2.

The first conductive layer M1 may include a different material from the second conductive layer M2, and the first conductive layer M1 may include the same material as the third conductive layer M3, however, the present disclosure should not be limited thereto or thereby.

Each of the first conductive layer M1 and the third conductive layer M3 may have a metal material with an anti-corrosion property. The first conductive layer M1 and the third conductive layer M3 may be respectively disposed on lower and upper surfaces of the second conductive layer M2 and may protect the second conductive layer M2 from scratches generated during the process. In addition, the first conductive layer M1 and the third conductive layer M3 may prevent corrosion of the second conductive layer M2 by moisture permeation. As an example, the first conductive layer M1 and the third conductive layer M3 may include at least one of molybdenum, titanium, and alloys thereof. However, materials for the first conductive layer M1 and the third conductive layer M3 should not be limited thereto or thereby.

The second conductive layer M2 may include a metal material with a low resistivity. As an example, the second conductive layer M2 may include at least one of gold, silver, copper, aluminum, platinum, and alloys thereof, however, a material for the second conductive layer M2 should not be limited thereto or thereby.

The second conductive layer M2 may have a thickness greater than a thickness of each of the first conductive layer M1 and the third conductive layer M3. As the second conductive layer M2 containing the material with a relatively low resistivity has a large thickness, the resistance of the first sensing electrodes TE1 (refer to FIG. 6) and the second sensing electrodes TE2 (refer to FIG. 6) may be relatively low.

The second sensor conductive layer MTL2 may include a recessed portion RP defined in a side surface thereof. The recessed portion RP may be defined in the side surface of the second sensor conductive layer MTL2, which defines the mesh opening M-OP. As an example, the second sensor conductive layer MTL2 may include the first sensing pattern SP1, the first connection pattern BP1, and the second sensing pattern SP2 shown in FIG. 6, and the recessed portion RP may be defined in side surfaces of the first sensing pattern SP1, the first connection pattern BP1, and the second sensing pattern SP2. A light absorption layer ABF may be disposed in the recessed portion RP.

Among side surfaces of the first, second, and third conductive layers M1, M2, and M3 of the second sensor conductive layer MTL2, the side surface of the second conductive layer M2 is disposed relatively inside, and thus, the recessed portion RP may be defined. That is, the side surface of the first conductive layer M1 and the side surface of the third conductive layer M3 may protrude outward more than the side surface of the second conductive layer M2. As the recessed portion RP is defined, the second sensor conductive layer MTL2 may have an undercut structure. The light absorption layer ABF may be disposed in the recessed portion RP defined in the second sensor conductive layer MTL2.

The second sensor insulating layer ISL3 may cover the second sensor conductive layer MTL2 and may be disposed on the first sensor insulating layer ISL2. The second sensor insulating layer ISL3 may be in contact with the side surface of the first conductive layer M1 and the side surface and an upper surface of the third conductive layer M3. The second sensor insulating layer ISL3 may not be in contact with the side surface of the second conductive layer M2. The second sensor insulating layer ISL3 may be spaced apart from the side surface of the second conductive layer M2 by the light absorption layer ABF.

The light absorption layer ABF may include a material having a high light absorption coefficient, that is, a low reflection property. As an example, the light absorption layer ABF may include a molybdenum oxide-based material, such as molybdenum-niobium oxide (MoNbOx) and molybdenum-tantalum oxide (MoTaOx). In the case where the light absorption layer ABF includes the molybdenum oxide-based material, the light absorption layer ABF may be formed by a sputtering process.

According to an embodiment, the light absorption layer ABF may include amorphous silicon (a-Si) or silicon carbide (SiC). In the case where the light absorption layer ABF includes amorphous silicon (a-Si) or silicon carbide (SiC), the light absorption layer ABF may be deposited by a chemical vapor deposition (CVD) process. The light absorption layer formed by the chemical vapor deposition process may be more advantageous to cover the recessed portion RP than the light absorption layer formed by the sputtering process.

Referring to FIG. 8B, the input sensor ISP may include the first sensor conductive layer MTL1, and the first sensor conductive layer MTL1 may include the first sensing electrodes TE1 (refer to FIG. 6) and the second sensing patterns SP2 (refer to FIG. 6). The first sensor conductive layer MTL1 may have a shape corresponding to the shape of the mesh pattern MP (refer to FIGS. 7A and 7B) and may be disposed in the non-light-emitting area NPXA.

The first sensor conductive layer MTL1 may include conductive layers M1, M2, and M3. The conductive layers M1, M2, and M3 may include first, second, and third conductive layers M1, M2, and M3. The first conductive layer M1 may be disposed on the sensor base layer ISL1, the second conductive layer M2 may be disposed on the first conductive layer M1, and the third conductive layer M3 may be disposed on the second conductive layer M2.

The first conductive layer M1 may include a different material from the second conductive layer M2, and the first conductive layer M1 may include the same material as the third conductive layer M3, however, the present disclosure should not be limited thereto or thereby. Details of the first, second, and third conductive layers M1, M2, and M3 of the second sensor conductive layer MTL2 described with reference to FIG. 8A may be applied to those of FIG. 8B.

A recessed portion RP may be defined in a side surface of the first sensor conductive layer MTL1. The recessed portion RP may be defined in the side surface of the first sensor conductive layer MTL1, which defines the mesh opening M-OP. As an example, the first sensor conductive layer MTL1 may include the second connection pattern BP2 shown in FIG. 6, and the recessed portion RP may be defined in a side surface of the second connection pattern BP2. The light absorption layer ABF may be disposed in the recessed portion RP.

Among side surfaces of the first, second, and third conductive layers M1, M2, and M3 of the first sensor conductive layer MTL1, the side surface of the second conductive layer M2 is disposed relatively inside, and thus, the recessed portion RP may be defined. That is, the side surface of the first conductive layer M1 and the side surface of the third conductive layer M3 may protrude outward more than the side surface of the second conductive layer M2. As the recessed portion RP is defined, the first sensor conductive layer MTL1 may have an undercut structure. The light absorption layer ABF may be disposed in the recessed portion RP defined in the first sensor conductive layer MTL1.

The first sensor insulating layer ISL2 may cover the first sensor conductive layer MTL1 and may be disposed on the sensor base layer ISL1. The first sensor insulating layer ISL2 may be in contact with the side surface of the first conductive layer M1 and the side surface and an upper surface of the third conductive layer M3. The first sensor insulating layer ISL2 may not be in contact with the second conductive layer M2. The first sensor insulating layer ISL2 may be spaced apart from the side surface of the second conductive layer M2 by the light absorption layer ABF.

As the recessed portion RP is defined in at least one of the side surface of the first sensor conductive layer MTL1 and the side surface of the second sensor conductive layer MTL2 included in the input sensor ISP and the light absorption layer ABF is disposed in the recessed portion RP, a reflectance of the sensor conductive layers MTL1 and MTL2 with respect to the external light may be reduced. This will be described in detail below with reference to FIGS. 8A and 8C.

Referring to FIG. 8C, a recessed portion RP may not be defined in a second sensor conductive layer MTL2' of an input sensor ISP' included in a display device DD' according to a comparative example, and a light absorption layer ABF may not be disposed. Accordingly, side surfaces of first, second, and third conductive layers M1', M2', and M3' of the second sensor conductive layer MTL2' may be aligned with each other in the comparative example. That is, the second sensor conductive layer MTL2' according to the comparative example may not have an undercut structure.

According to the comparative example, an external light LL1 incident into a display panel DP from the outside of the display device DD' may be reflected by first electrodes AE1, AE2, and AE3 of light emitting elements OL1, OL2, and OL3. A portion of a reflected light LL2 reflected by the first electrodes AE1, AE2, and AE3 may be incident into a side surface of the second sensor conductive layer MTL2'. A reflected light LL3 reflected by the second sensor conductive layer MTL2' may travel toward an upper side of the display device DD' by an inclination angle of the side surfaces of the first, second, and third conductive layers M1', M2', and M3'. Accordingly, the reflected light reflected by the first electrodes AE1, AE2, and AE3 and the second sensor conductive layer MTL2' may be viewed from the outside of the display device DD'.

Referring to FIG. 8A, as the recessed portion RP is defined in the side surface of the second sensor conductive layer MTL2 and the light absorption layer ABF is disposed in the recessed portion RP, a reflectance of an external light LL1 incident into the display panel DP from the outside of the display device DD may be reduced. FIG. 8A shows a path of the external light LL1. The external light LL1 may be incident into the light emitting elements OL1, OL2, and OL3 and may be reflected by the first electrodes AE1, AE2, and AE3. A portion of the reflected light LL2 reflected by the first electrodes AE1, AE2, and AE3 may be incident into the side surface of the second sensor conductive layer MTL2. At least a portion of the reflected light LL2 incident into the side surface of the second sensor conductive layer MTL2 may be absorbed by the light absorption layer ABF disposed in the side surface of the second conductive layer M2. FIG. 8A shows the example where all of the reflected light LL2 is absorbed by the light absorption layer ABF, however, only a portion of the reflected light LL2 may be absorbed by the light absorption layer ABF. As the light absorption layer ABF is disposed in the recessed portion RP defined in the side surface of the second sensor conductive layer MTL2, the reflected light LL2 reflected by the first electrodes AE1, AE2, and AE3 may be prevented from being viewed to the user after traveling to the upper side of the display device DD. As a result, the reflectance of the external light may be reduced, and the first electrodes AE1, AE2, and AE3 of the display panel DP may be prevented from being viewed.

In addition, as the recessed portion RP is defined in the side surface of the second sensor conductive layer MTL2 or the first sensor conductive layer MTL1 and the light absorption layer ABF is disposed in the recessed portion RP, a process of cutting a portion of the sensing patterns of the input sensor ISP to improve the visibility of the display panel DP may be omitted. That is, the visibility may be improved without cutting the portion of the sensing patterns. As the process of cutting the portion of the sensing patterns is omitted, the resistance of the sensing electrodes TE (refer to FIG. 6) of the input sensor ISP may be reduced, and a sensing performance of the input sensor ISP may be improved.

Figure 9A:
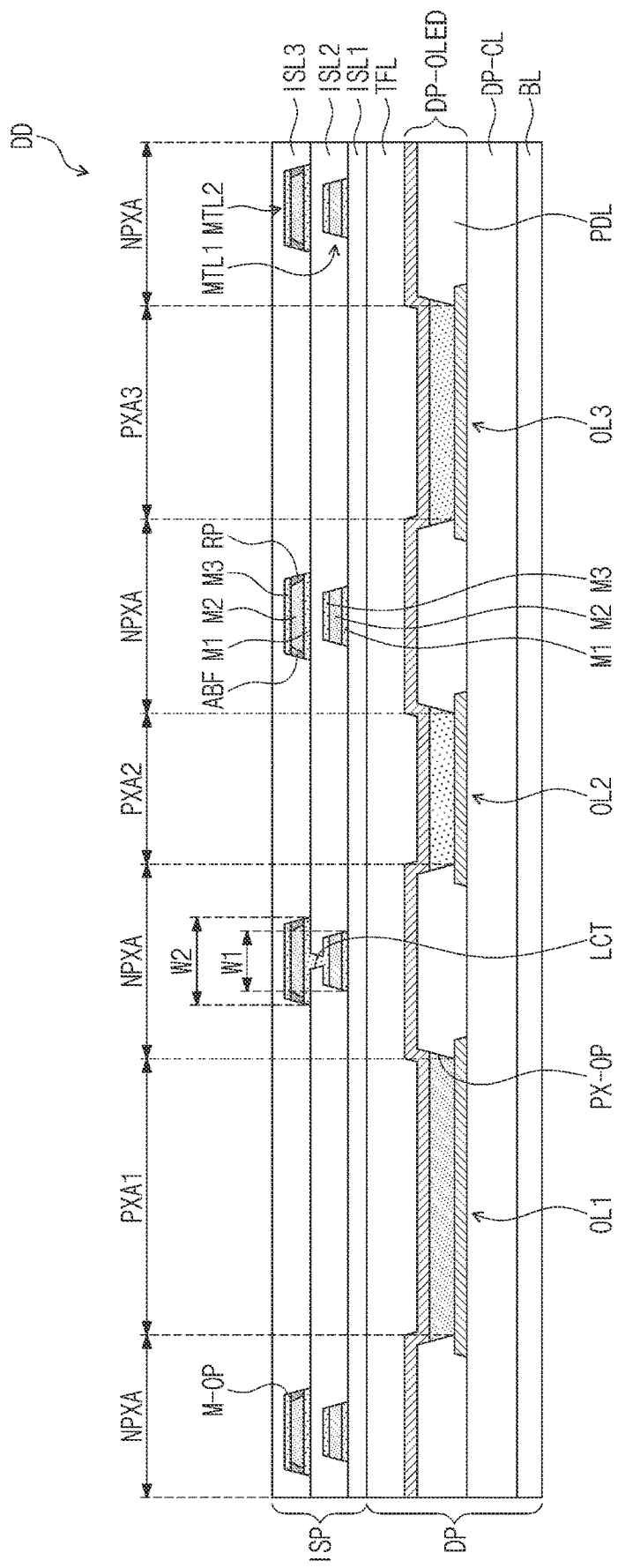
FIGS. 9A, 9B, and 9C are cross-sectional views of display devices according to embodiments of the present disclosure.
Figure 9B:
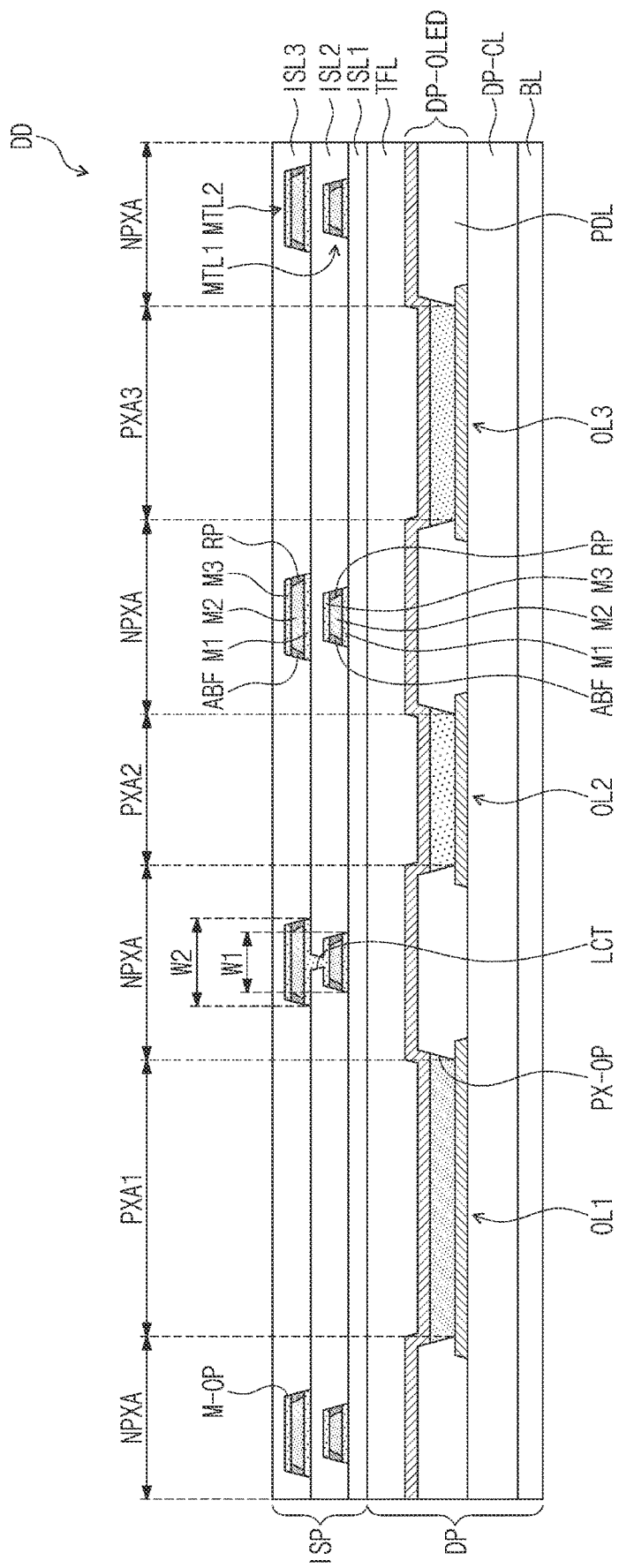
Figure 9C:
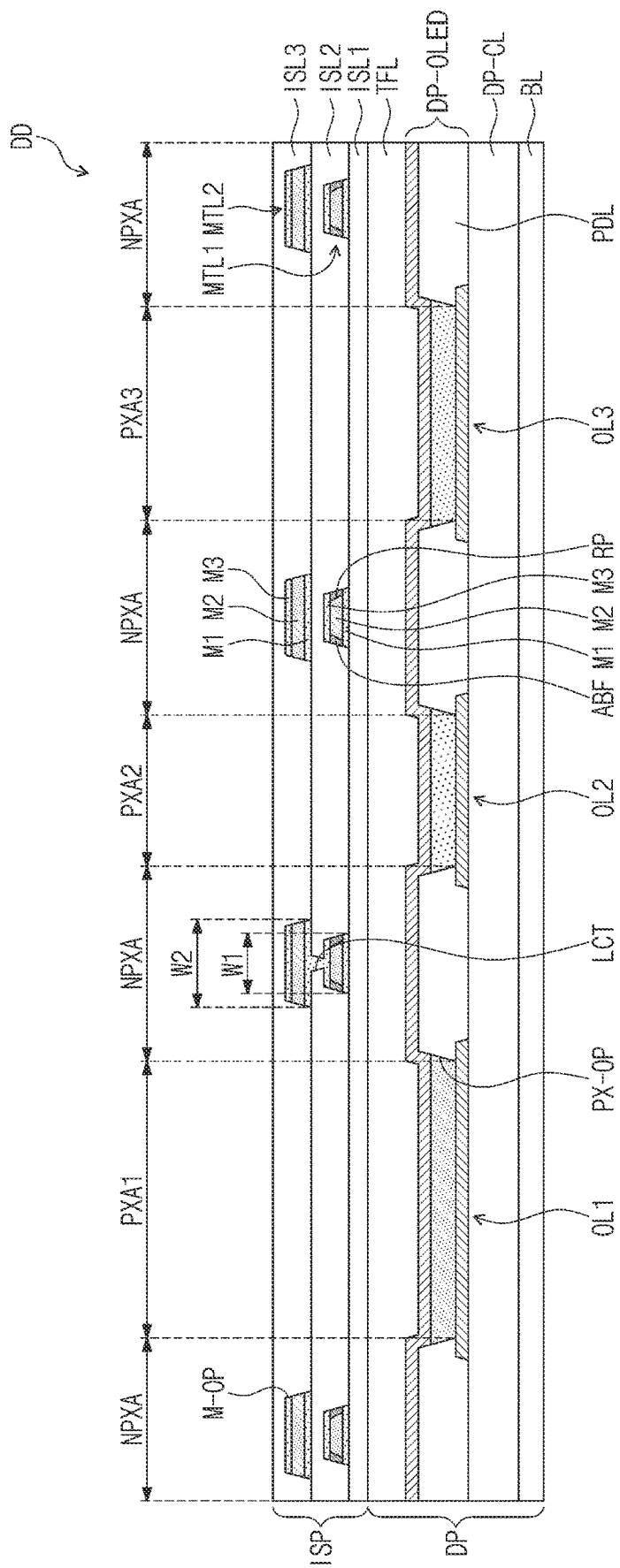

FIG. 9A to 9C are cross-sectional views of display devices DD according to embodiments of the present disclosure. FIGS. 9A to 9C are cross-sectional views illustrating various embodiments of the present disclosure.

Referring to FIGS. 9A to 9C, an input sensor ISP may include a sensor base layer ISL1, a first sensor insulating layer ISL2, a second sensor insulating layer ISL3, a first sensor conductive layer MTL1, and a second sensor conductive layer MTL2. Details of the components of the input sensor ISP described with reference to FIGS. 1 to 8B may be applied to those of FIGS. 9A to 9C.

Each of the first sensor conductive layer MTL1 and the second sensor conductive layer MTL2 may have a shape corresponding to the shape of the mesh pattern MP (refer to FIGS. 7A and 7B) and may be disposed in a non-light-emitting area NPXA. The first sensor conductive layer MTL1 may be disposed to overlap the second sensor conductive layer MTL2 in the non-light-emitting area NPXA.

Some of patterns formed in the first sensor conductive layer MTL1 may be connected to some of patterns formed in the second sensor conductive layer MTL2 via a contact portion LCT defined through the first sensor insulating layer ISL2.

The first sensor conductive layer MTL1 may further include a dummy pattern disposed to overlap sensing patterns formed in the second sensor conductive layer MTL2 and electrically insulated from the sensing patterns formed in the second sensor conductive layer MTL2, however, the present disclosure should not be limited thereto or thereby.

Each of the first sensor conductive layer MTL1 and the second sensor conductive layer MTL2 may include first, second, and third conductive layers M1, M2, and M3. The second conductive layer M2 may include a different material from each of the first conductive layer M1 and the third conductive layer M3, and the first conductive layer M1 may include the same material as the third conductive layer M3. The first sensor conductive layer MTL1 may have substantially the same stack structure as that of the second sensor conductive layer MTL2, however, the present disclosure should not be limited thereto or thereby. Details of the first, second, and third conductive layers M1, M2, and M3 described with reference to FIGS. 8A to 8B may be applied to those of FIGS. 9A to 9C.

A line width W2 (hereinafter, referred to as a second line width W2) of the pattern formed in the second sensor conductive layer MTL2 may be greater than a line width W1 (hereinafter, referred to as a first line width W1) of the pattern formed in the first sensor conductive layer MTL1. A side surface of the first sensor conductive layer MTL1 may overlap the second sensor conductive layer MTL2 when viewed in the plane. That is, a side surface of the second sensor conductive layer MTL2 may be disposed outside the side surface of the first sensor conductive layer MTL1.

The first line width W1 of the first sensor conductive layer MTL1 may correspond to a line width of the mesh pattern MP (refer to FIGS. 7A and 7B) included in the first sensor conductive layer MTL1. The second line width W2 of the second sensor conductive layer MTL2 may correspond to a line width of the mesh pattern MP (refer to FIGS. 7A and 7B) included in the second sensor conductive layer MTL2.

Referring to FIG. 9A, a recessed portion RP may be defined in the side surface of the second sensor conductive layer MTL2, a light absorption layer ABF may be disposed in the recessed portion RP, and the recessed portion RP may not be defined in the side surface of the first sensor conductive layer MTL1.

In detail, a side surface of the first conductive layer M1 and a side surface of the third conductive layer M3 of the second sensor conductive layer MTL2 may protrude outward more than a side surface of the second conductive layer M2. As the recessed portion RP is defined, the second sensor conductive layer MTL2 may have an undercut structure. The light absorption layer ABF may be disposed in the recessed portion RP defined in the second sensor conductive layer MTL2. The second sensor insulating layer ISL3 may cover the second sensor conductive layer MTL2 and may be disposed on the first sensor insulating layer ISL2. The second sensor insulating layer ISL3 may be in contact with the side surface of the first conductive layer M1 and the side surface and an upper surface of the third conductive layer M3 of the second sensor conductive layer MTL2. The second sensor insulating layer ISL3 may not be in contact with the side surface of the second conductive layer M2 of the second sensor conductive layer MTL2. The second sensor insulating layer ISL3 may be spaced apart from the side surface of the second conductive layer M2 of the second sensor conductive layer MTL2 by the light absorption layer ABF.

Side surfaces of the first, second, and third conductive layers M1, M2, and M3 of the first sensor conductive layer MTL1 in which the recessed portion RP is not defined may be substantially aligned with each other.

At least a portion of a reflected light traveling to the side surface of the second sensor conductive layer MTL2 among external lights reflected by first electrodes of light emitting elements OL1, OL2, and OL3 may be absorbed by the light absorption layer ABF disposed in the recessed portion RP. Accordingly, a ratio of the reflected light reflected to an upper side of the display device DD may be reduced. As the second line width W2 of the second sensor conductive layer MTL2 is greater than the first line width W1 of the first sensor conductive layer MTL1, even though a reflected light traveling to the side surface of the first sensor conductive layer MTL1 in the external light reflected by the first electrodes of the light emitting elements OL1, OL2, and OL3 is reflected by the side surface of the first sensor conductive layer MTL1, the reflected light may be prevented from traveling to the upper side of the display device DD by the second sensor conductive layer MTL2 having the second line width W2 that is greater than the first line width W1.

Referring to FIG. 9B, a recessed portion RP may be defined in each of the first sensor conductive layer MTL1 and the second sensor conductive layer MTL2, and a light absorption layer ABF may be disposed in the recessed portion RP.

In detail, a side surface of the first conductive layer M1 and a side surface of the third conductive layer M3 of the first sensor conductive layer MTL1 may protrude outward more than a side surface of the second conductive layer M2. As the recessed portion RP is defined, the first sensor conductive layer MTL1 may have an undercut structure. In addition, the light absorption layer ABF may be disposed in the recessed portion RP defined in the first sensor conductive layer MTL1. The first sensor insulating layer ISL2 may cover the first sensor conductive layer MTL1 and may be disposed on the sensor base layer ISL1. The first sensor insulating layer ISL2 may be in contact with the side surface of the first conductive layer M1 and the side surface and an upper surface of the third conductive layer M3 of the first sensor conductive layer MTL1. The first sensor insulating layer ISL2 may not be in contact with the side surface of the second conductive layer M2 of the first sensor conductive layer MTL1. The first sensor insulating layer ISL2 may be spaced apart from the side surface of the second conductive layer M2 of the first sensor conductive layer MTL1 by the light absorption layer ABF.

A side surface of the first conductive layer M1 and a side surface of the third conductive layer M3 of the second sensor conductive layer MTL2 may protrude outward more than a side surface of the second conductive layer M2. As the recessed portion RP is defined, the second sensor conductive layer MTL2 may have an undercut structure. In addition, the light absorption layer ABF may be disposed in the recessed portion RP defined in the second sensor conductive layer MTL2. The second sensor insulating layer ISL3 may cover the second sensor conductive layer MTL2 and may be disposed on the first sensor insulating layer ISL2. The second sensor insulating layer ISL3 may be in contact with the side surface of the first conductive layer M1 and the side surface and an upper surface of the third conductive layer M3 of the second sensor conductive layer MTL2. The second sensor insulating layer ISL3 may not be in contact with the side surface of the second conductive layer M2 of the second sensor conductive layer MTL2. The second sensor insulating layer ISL3 may be spaced apart from the side surface of the second conductive layer M2 of the second sensor conductive layer MTL2 by the light absorption layer ABF.

As the recessed portion RP is defined in each of the side surface of the first sensor conductive layer MTL1 and the side surface of the second sensor conductive layer MTL2 and the light absorption layer ABF is disposed in the recessed portion RP, at least a portion of a reflected light traveling to the side surface of the first sensor conductive layer MTL1 and at least a portion of a reflected light traveling to the side surface of the second sensor conductive layer MTL2 among external lights reflected by first electrodes of light emitting elements OL1, OL2, and OL3 may be absorbed by the light absorption layer ABF disposed in the recessed portion RP. As a result, a ratio of the external light reflected to an upper side of the display device DD by the first electrodes of the light emitting elements OL1, OL2, and OL3, the first sensor conductive layer MTL1, and the second sensor conductive layer MTL2 may be reduced. As the recessed portion RP is defined in each of the side surface of the first sensor conductive layer MTL1 and the side surface of the second sensor conductive layer MTL2 and the light absorption layer ABF is disposed in the recessed portion RP, the reflectance of the external light may be reduced, and the visibility of the display panel DP may be improved.

Referring to FIG. 9C, a recessed portion RP may be defined in the side surface of the first sensor conductive layer MTL1, and a light absorption layer ABF may be disposed in the recessed portion RP. The recessed portion RP may not be defined in the side surface of the second sensor conductive layer MTL2.

In detail, a side surface of the first conductive layer M1 and a side surface of the third conductive layer M3 of the first sensor conductive layer MTL1 may protrude outward more than a side surface of the second conductive layer M2. As the recessed portion RP is defined, the first sensor conductive layer MTL1 may have an undercut structure. The light absorption layer ABF may be disposed in the recessed portion RP defined in the first sensor conductive layer MTL1. The first sensor insulating layer ISL2 may cover the first sensor conductive layer MTL1 and may be disposed on the sensor base layer ISL1. The first sensor insulating layer ISL2 may be in contact with the side surface of the first conductive layer M1 and the side surface and an upper surface of the third conductive layer M3 of the first sensor conductive layer MTL1. The first sensor insulating layer ISL2 may not be in contact with the side surface of the second conductive layer M2 of the first sensor conductive layer MTL1. The first sensor insulating layer ISL2 may be spaced apart from the side surface of the second conductive layer M2 of the first sensor conductive layer MTL1 by the light absorption layer ABF.

Side surfaces of the first, second, and third conductive layers M1, M2, and M3 of the second sensor conductive layer MTL2 in which the recessed portion RP is not defined may be substantially aligned with each other.

At least a portion of a reflected light traveling to the side surface of the first sensor conductive layer MTL1 among external lights reflected by first electrodes of light emitting elements OL1, OL2, and OL3 may be absorbed by the light absorption layer ABF disposed in the recessed portion RP. Accordingly, a ratio of the reflected light reflected to an upper side of the display device DD may decrease.

FIGS. 10A to 10E are cross-sectional views of processes of a method of manufacturing the display device according to an embodiment of the present disclosure.

FIGS. 10A to 10E schematically show processes of forming the first sensor conductive layer MTL1 (refer to FIGS. 8A to 9C) or the second sensor conductive layer MTL2 (refer to FIGS. 8A to 9C) to allow the recessed portion RP to be defined in the side surface thereof and to dispose the light absorption layer ABF in the recessed portion RP.

Figure 10A:
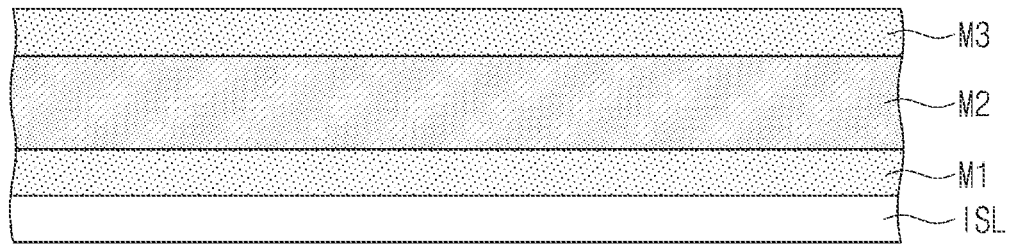
FIGS. 10A, 10B, 10C, 10D, and 10E are cross-sectional views of processes of a method of manufacturing a display device according to an embodiment of the present disclosure.
Figure 10B:
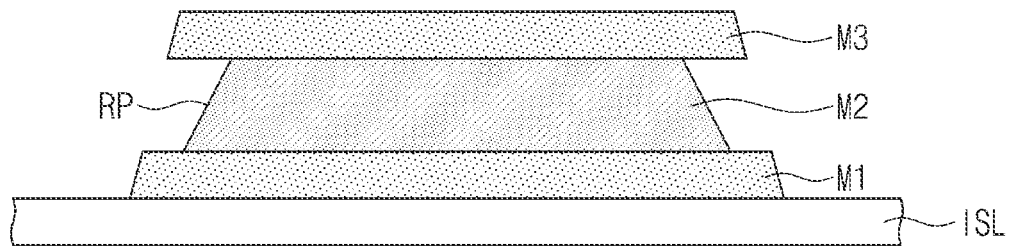

In the case where the recessed portion RP and the light absorption layer ABF are formed in the first sensor conductive layer MTL1 (refer to FIGS. 8A to 9C), an insulating layer ISL of FIGS. 10A and 10B may correspond to the sensor base layer ISL1 (refer to FIGS. 8A to 9C). In addition, the first, second, and third conductive layers M1, M2, and M3 of FIGS. 10A and 10B may respectively correspond to the first, second, and third conductive layers M1, M2, and M3 (refer to FIGS. 8A to 9C) of the first sensor conductive layer MTL1 (refer to FIGS. 8A to 9C).

In the case where the recessed portion RP and the light absorption layer ABF are formed in the second sensor conductive layer MTL2 (refer to FIGS. 8A to 9C), the insulating layer ISL of FIGS. 10A and 10B may correspond to the first sensor insulating layer ISL2 (refer to FIGS. 8A to 9C). In addition, the first, second, and third conductive layers M1, M2, and M3 of FIGS. 10A and 10B may respectively correspond to the first, second, and third conductive layers M1, M2, and M3 (refer to FIGS. 8A to 9C) of the second sensor conductive layer MTL2 (refer to FIGS. 8A to 9C).

Referring to FIG. 10A, the first conductive layer M1, the second conductive layer M2, and the third conductive layer M3 may be sequentially deposited on the insulating layer ISL to form a conductive layer having a three-layer structure. As an example, the first, second, and third conductive layers M1, M2, and M3 may be formed by a sputtering process.

The second conductive layer M2 may have the thickness greater than the thickness of each of the first conductive layer M1 and the third conductive layer M3. As the second conductive layer M2 containing the material with the relatively low resistivity has the relatively greater thickness, the resistance of the first sensing electrodes TE1 (refer to FIG. 6) and the second sensing electrodes TE2 (refer to FIG. 6) may be relatively low.

The first conductive layer M1 and the third conductive layer M3 may include the same material as each other. The second conductive layer M2 may include the material different from the first conductive layer M1 and the third conductive layer M3.

Each of the first conductive layer M1 and the third conductive layer M3 may have the metal material with the anti-corrosion property. The first conductive layer M1 and the third conductive layer M3 may be respectively disposed on the lower and upper surfaces of the second conductive layer M2 and may protect the second conductive layer M2 from scratches generated during the process. In addition, the first conductive layer M1 and the third conductive layer M3 may prevent corrosion of the second conductive layer M2 by moisture permeation. As an example, the first conductive layer M1 and the third conductive layer M3 may include at least one of molybdenum, titanium, and alloys thereof. However, the materials for the first conductive layer M1 and the third conductive layer M3 should not be limited thereto or thereby.

The second conductive layer M2 may include the metal material with the low resistivity. As an example, the second conductive layer M2 may include at least one of gold, silver, copper, aluminum, platinum, and alloys thereof, however, the material for the second conductive layer M2 should not be limited thereto or thereby.

Referring to FIG. 10B, the first, second, and third conductive layers M1, M2, and M3 may be patterned by photoresist and etching processes, and the recessed portion RP may be formed in the side surface of the first, second, and third conductive layers M1, M2, and M3. In FIG. 10B, a photomask and a photoresist are not illustrated.

As described above, since the second conductive layer M2 includes the different material from the first conductive layer M1 and the third conductive layer M3, an etch rate of the second conductive layer M2 may be different from an etch rate of the first conductive layer M1 and the third conductive layer M3.

The recessed portion RP may be formed in the side surface of the first, second, and third conductive layers M1, M2, and M3 using a difference between the etch rate of the second conductive layer M2 and the etch rate of the first conductive layer M1 and the third conductive layer M3. In detail, the recessed portion RP may be formed by over-etching the second conductive layer M2 using an etching solution with higher etch selectivity for the second conductive layer M2 than the etch selectivity for the first conductive layer M1 and the third conductive layer M3. According to an embodiment, the recessed portion RP may be formed in the second conductive layer M2 by an additional process that selectively etches the second conductive layer M2. The process of forming the recessed portion RP should not be particularly limited as long as the side surface of the second conductive layer M2 is formed inside the side surface of the first and third conductive layers M1 and M3.

Figure 10C:
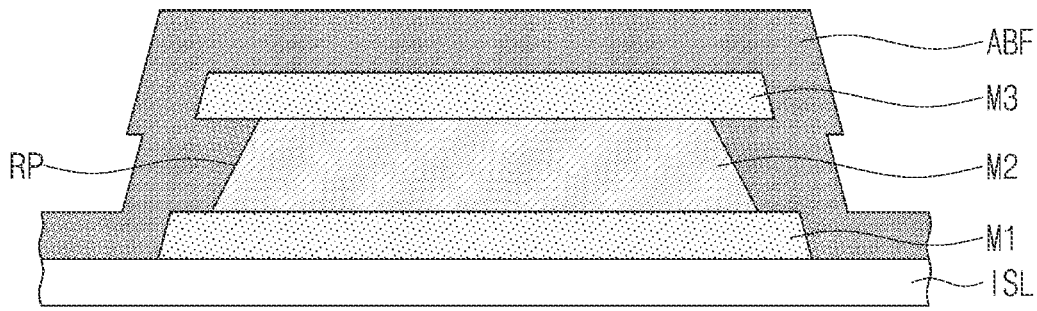

Referring to FIG. 10C, the light absorption layer ABF may be deposited to cover the first, second, and third conductive layers M1, M2, and M3 through the sputtering process or the chemical vapor deposition (CVD) process.

In detail, the light absorption layer including the molybdenum oxide-based material, such as molybdenum-niobium oxide (MoNbOx) and molybdenum-tantalum oxide (MoTaOx), may be deposited by the sputtering process. The light absorption layer including amorphous silicon (a-Si) or silicon carbide (SiC) may be deposited by the chemical vapor deposition process. In this case, the light absorption layer formed by the chemical vapor deposition process may be more advantageous to cover the recessed portion RP in the side surface of the first, second, and third conductive layers M1, M2, and M3 than the light absorption layer formed by the sputtering process.

Figure 10D:
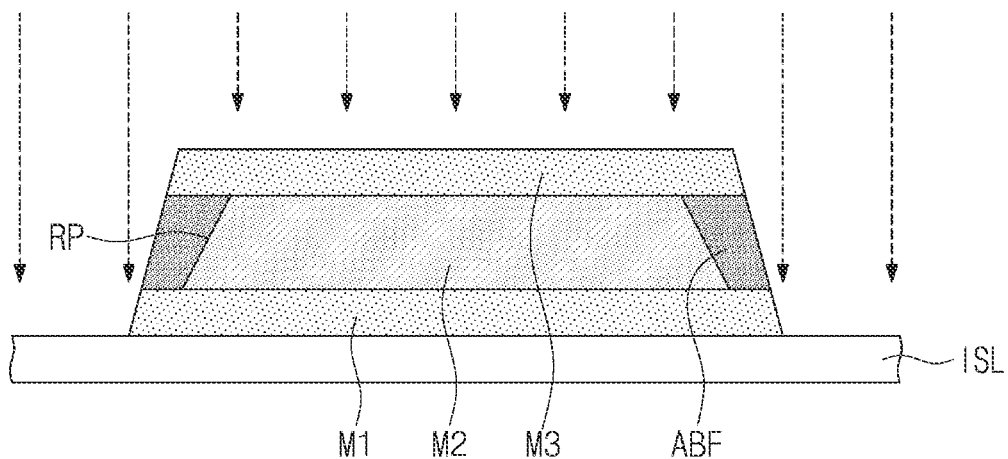

Referring to FIG. 10D, the light absorption layer ABF may remain only in the recessed portion RP and may be removed from other areas by a dry etching process. In detail, an anisotropic etching process may be entirely applied to the insulating layer ISL as shown by an arrow direction in FIG. 10D, a separate additional mask may not be required, and thus, the manufacturing process efficiency of the display device DD may be improved.

Figure 10E:
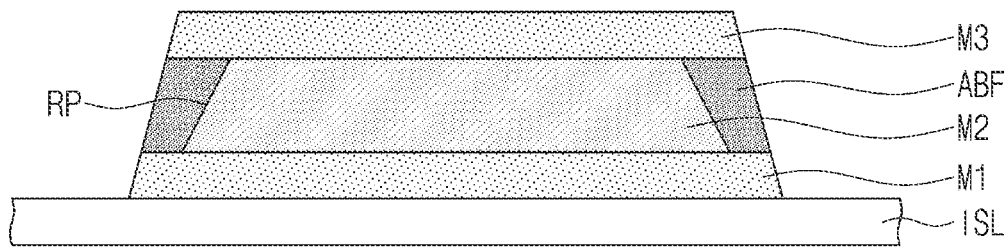

FIG. 10E shows the state in which the recessed portion RP is formed in the side surface of the first, second, and third conductive layers M1, M2, and M3 and the light absorption layer ABF is disposed in the recessed portion RP. As the recessed portion RP is formed in the side surface of the first sensor conductive layer MTL1 (refer to FIGS. 8A to 9C) or the side surface of the second sensor conductive layer MTL2 (refer to FIGS. 8A to 9C) and the light absorption layer ABF is formed in the recessed portion RP, at least a portion of the reflected light traveling to the side surface of the first sensor conductive layer MTL1 (refer to FIGS. 8A to 9C) or the side surface of the second sensor conductive layer MTL2 (refer to FIGS. 8A to 9C) among the external lights reflected by the first electrodes of the light emitting elements may be absorbed by the light absorption layer ABF disposed in the recessed portion RP. As a result, the ratio of the external light reflected to the upper side of the display device DD by the first electrodes, the first sensor conductive layer MTL1 (refer to FIGS. 8A to 9C), or the second sensor conductive layer MTL2 (refer to FIGS. 8A to 9C) may be reduced. That is, the reflectance of the external light may be reduced, and the visibility of the display panel DP may be improved.

Figure 11A:
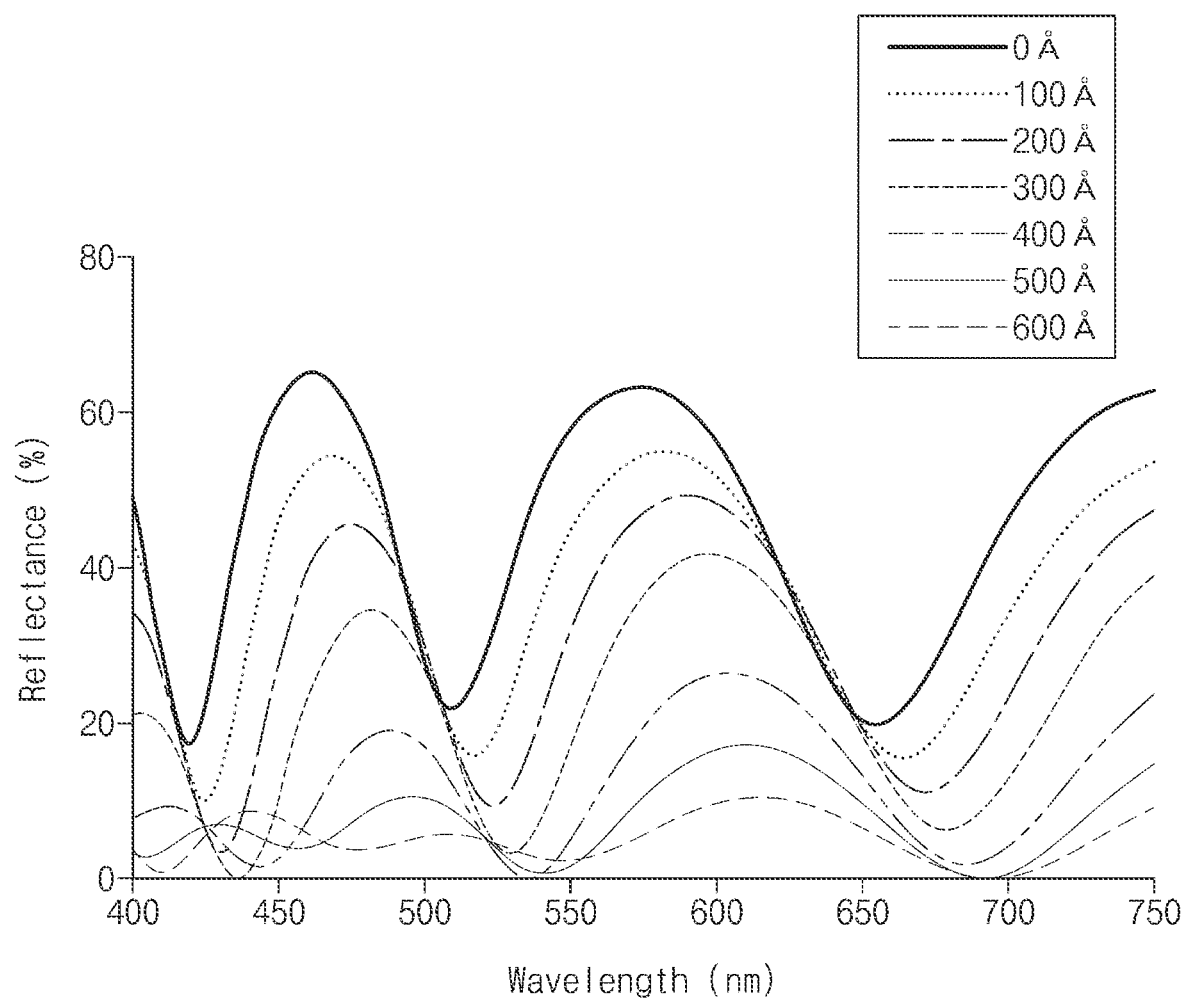
FIGS. 11A and 11B are graphs of a reflectance as a function of a wavelength according to an embodiment of the present disclosure.
Figure 11B:
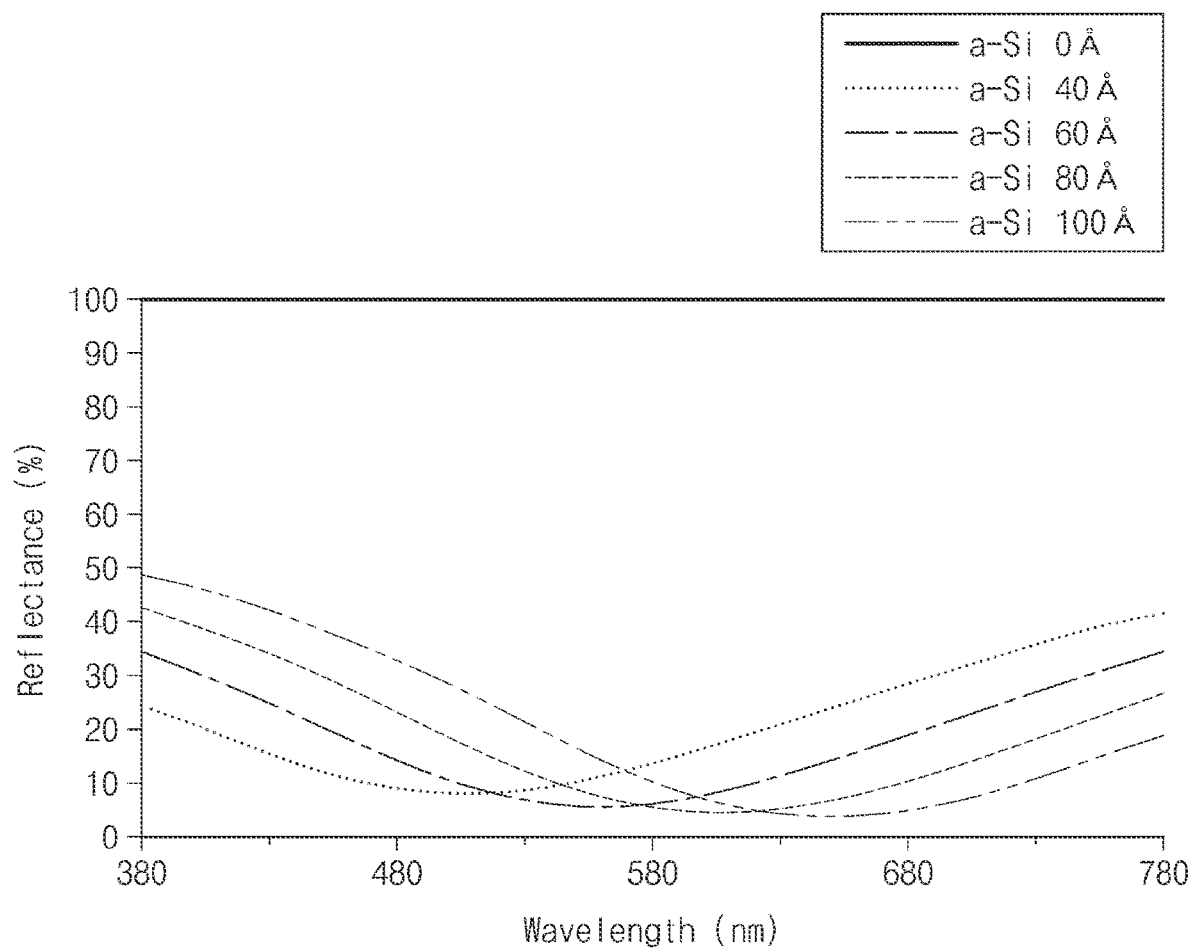

FIGS. 11A and 11B are graphs of a reflectance as a function of a wavelength according to an embodiment of the present disclosure. FIGS. 11A and 11B are graphs showing an external light reflectance of an aluminum substrate according to thicknesses of the light absorption layer.

The reflectance of FIG. 11A was obtained by measuring the external light reflectance after forming a molybdenum-niobium oxide (MoNbOx) layer on the aluminum substrate and forming a silicon nitride (SiNx) layer on the molybdenum-niobium oxide (MoNbOx) layer. As shown in FIG. 11A, the reflectance was measured by varying the thickness of the molybdenum-niobium oxide (MoNbOx) layer to about 0 Å, 100 Å, 200 Å, 300 Å, 400 Å, 500 Å, and 600 Å, respectively. The silicon nitride (SiNx) layer having a thickness of about 3000 Å was used. The reflectance was measured with respect to a wavelength from about 400 nm to about 750 nm.

Referring to FIG. 11A, when the thickness of the molybdenum-niobium oxide (MoNbOx) layer was about 400 Å, the reflectance was reduced by about half compared to that when the molybdenum-niobium oxide (MoNbOx) layer was not present (OA). In a case where a molybdenum-niobium oxide (MoNbOx) light absorption layer having the thickness of about 1000 Å or less was disposed in the recessed portion defined in the side surface of the sensor conductive layers, the external light reflectance was reduced.

The reflectance of FIG. 11B was obtained by measuring the external light reflectance after forming an amorphous silicon (a-Si) layer on the aluminum substrate. As shown in FIG. 11B, the reflectance was measured by varying the thickness of the amorphous silicon (a-Si) layer to about 0 Å, 40 Å, 60 Å, 80 Å, and 100 Å, respectively. The external light reflectance was measured with respect to a wavelength from about 380 nm to about 780 nm. Table 1 below shows the external light reflectance with respect to a wavelength of about 550 nm.

TABLE 1

| a-Si thickness (Å) | reflectance (%), at 550 nm |
| --- | --- |
| 0 | 100 |
| 40 | 10.6 |
| 60 | 6.0 |
| 80 | 8.4 |
| 100 | 15.8 |

Referring to FIGS. 11B and Table 1, when the thickness of the amorphous silicon (a-Si) layer was about 40 Å, the reflectance was reduced to about 10% of the reflectance when the thickness of the amorphous silicon (a-Si) layer was 0 Å. In a case where an amorphous silicon (a-Si) light absorption layer having the thickness of about 100 Å or less was disposed in the recessed portion defined in the side surface of the sensor conductive layers, the reflectance of the external light was sufficiently reduced.

Referring to FIGS. 11A and 11B, a decrease in external light reflectance was achieved with a thinner light absorption layer when the amorphous silicon (a-Si) is applied to the light absorption layer compared to when the molybdenum-niobium oxide (MoNbOx) is applied to the light absorption layer.

Meanwhile, since the light absorption layer is formed in the recessed portion defined in the side surface of the sensor conductive layers, characteristics to cover the recessed portion may be excellent when the light absorption layer with amorphous silicon (a-Si) is formed by the chemical vapor deposition process than when the light absorption layer with molybdenum-niobium oxide (MoNbOx) is formed by the sputtering process.

Although embodiments of the present disclosure have been described, it is understood that the present disclosure should not be limited to these embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present inventive concept shall be determined according to the attached claims.

What is claimed is:

1. A display device comprising:
a display panel comprising a light emitting area and a non-light-emitting area adjacent to the light emitting area; and
an input sensor disposed on the display panel, the input sensor comprising:
a first sensor conductive layer disposed on the display panel;
a first sensor insulating layer disposed on the first sensor conductive layer; and
a second sensor conductive layer disposed on the first sensor insulating layer,
wherein at least one of the first sensor conductive layer and the second sensor conductive layer is provided with a mesh opening defined therethrough,
at least one of a side surface of the first sensor conductive layer and a side surface of the second sensor conductive layer is provided with a recessed portion defined therein,
the input sensor further comprises a light absorption layer disposed in the recessed portion,
the second sensor conductive layer comprises a first conductive layer disposed on the first sensor insulating layer, a second conductive layer disposed on the first conductive layer, and a third conductive layer disposed on the second conductive layer,
a side surface of the first conductive layer and a side surface of the third conductive layer protrude outward more than a side surface of the second conductive layer to define the recessed portion,
the side surface of the second conductive layer is covered by the light absorption layer,
the input sensor further comprises a second sensor insulating layer disposed on the second sensor conductive layer, and
the second sensor insulating layer is in contact with the side surface of the first conductive layer, the side surface of the third conductive layer, and an upper surface of the third conductive layer and is not in contact with the side surface of the second conductive layer.

2. The display device of claim 1,
wherein the first conductive layer and the third conductive layer comprise a same material as each other, and
the second conductive layer comprises a different material from the first conductive layer and the third conductive layer.

3. The display device of claim 1,
wherein the first conductive layer and the third conductive layer comprise titanium (Ti), and
the second conductive layer comprises aluminum (Al) or copper (Cu).

4. The display device of claim 1, wherein the light absorption layer comprises molybdenum-niobium oxide (MoNbO$_x$).

5. The display device of claim 4, wherein the light absorption layer has a thickness of about 400 angstroms to about 1000 angstroms.

6. The display device of claim 1, wherein the light absorption layer comprises amorphous silicon (a-Si) or silicon carbide (SiC).

7. The display device of claim 6, wherein the light absorption layer has a thickness of about 40 angstroms to about 1000 angstroms.

8. A display device comprising:
a display panel comprising a light emitting area and a non-light-emitting area adjacent to the light emitting area; and
an input sensor disposed on the display panel, the input sensor comprising:
a first sensor conductive layer disposed on the display panel;
a first sensor insulating layer disposed on the first sensor conductive layer; and
a second sensor conductive layer disposed on the first sensor insulating layer,
wherein at least one of the first sensor conductive layer and the second sensor conductive layer is provided with a mesh opening defined therethrough,
at least one of a side surface of the first sensor conductive layer and a side surface of the second sensor conductive layer is provided with a recessed portion defined therein,
the input sensor further comprises a light absorption layer disposed in the recessed portion,
the first sensor conductive layer comprises a first conductive layer disposed on the display panel, a second conductive layer disposed on the first conductive layer, and a third conductive layer disposed on the second conductive layer,
a side surface of the first conductive layer and a side surface of the third conductive layer protrude outward more than a side surface of the second conductive layer to form the recessed portion,
the side surface of the second conductive layer is covered by the light absorption layer, and
the first sensor insulating layer is in contact with the side surface of the first conductive layer, the side surface of the third conductive layer, and an upper surface of the third conductive layer and is not in contact with the side surface of the second conductive layer.

9. The display device of claim 8,
wherein the first conductive layer and the third conductive layer comprise a same material as each other, and
the second conductive layer comprises a different material from the first conductive layer and the third conductive layer.

10. The display device of claim 8,
wherein the first conductive layer and the third conductive layer comprise titanium (Ti), and
the second conductive layer comprises aluminum (Al) or copper (Cu).

11. A display device comprising:
a display panel comprising a display area; and
an input sensor comprising a sensing area overlapping the display area and disposed on the display panel, the input sensor comprising:

first sensing electrodes disposed in the sensing area and each comprising first sensing patterns arranged in a first direction; and second sensing electrodes disposed in the sensing area and each comprising second sensing patterns arranged in a second direction intersecting the first direction, wherein each of the first sensing patterns and the second sensing patterns comprise a side surface in which a recessed portion is defined, the input sensor further comprises a light absorption layer disposed in the recessed portion, each of the first sensing patterns and the second sensing patterns comprise a first conductive layer, a second conductive layer disposed on the first conductive layer, and a third conductive layer disposed on the second conductive layer, a side surface of the first conductive layer and a side surface of the third conductive layer protrude outward more than a side surface of the second conductive layer to define the recessed portion, the side surface of the second conductive layer is covered by the light absorption layer, the input sensor further comprises a sensor insulating layer disposed on the first sensing electrodes and the second sensing electrodes, and the sensor insulating layer is in contact with the side surface of the first conductive layer, the side surface of the third conductive layer, and an upper surface of the third conductive layer and is not in contact with the side surface of the second conductive layer.

12. The display device of claim 11,
wherein the first conductive layer and the third conductive layer comprise a same material as each other, and
the second conductive layer comprises a different material from the first conductive layer and the third conductive layer.

13. The display device of claim 11,
wherein the first conductive layer and the third conductive layer comprise titanium (Ti), and
the second conductive layer comprises aluminum (Al) or copper (Cu).

14. The display device of claim 11,
wherein the light absorption layer comprises molybdenum-niobium oxide ($MoNbO_x$), and
the light absorption layer has a thickness of about 400 angstroms to about 1000 angstroms.

15. The display device of claim 11,
wherein the light absorption layer comprises amorphous silicon (a-Si) or silicon carbide (SiC), and
the light absorption layer has a thickness of about 40 angstroms to about 1000 angstroms.

16. The display device of claim 11, wherein each of the first sensing patterns and the second sensing patterns comprise a mesh opening.

* * * * *